United States Patent [19]

Nonoshita

[11] Patent Number: 5,659,673
[45] Date of Patent: Aug. 19, 1997

[54] IMAGE PROCESSING APPARATUS

[75] Inventor: Hiroshi Nonoshita, Yokohama, Japan

[73] Assignee: Canon Kabushiki Kaisha, Tokyo, Japan

[21] Appl. No.: 411,404

[22] Filed: Mar. 28, 1995

Related U.S. Application Data

[63] Continuation of Ser. No. 44,082, Apr. 6, 1993, abandoned, which is a continuation of Ser. No. 450,927, Dec. 14, 1989, abandoned.

[30] Foreign Application Priority Data

Dec. 16, 1988 [JP] Japan ................................. 63-316501
Dec. 16, 1988 [JP] Japan ................................. 63-316502

[51] Int. Cl.$^6$ ........................................................ G06F 15/00
[52] U.S. Cl. ........................................................ 395/131
[58] Field of Search ............................ 395/131, 129, 395/166; 345/153, 154, 155

[56] References Cited

U.S. PATENT DOCUMENTS

| | | | |
|---|---|---|---|
| 4,905,097 | 2/1990 | Watanabe et al. | 358/456 |
| 4,924,413 | 5/1990 | Suwannukul | 364/521 |
| 4,933,879 | 6/1990 | Ando et al. | 364/522 |
| 4,958,147 | 9/1990 | Kanema et al. | 340/706 |
| 5,003,247 | 3/1991 | Havel | 324/115 |
| 5,251,298 | 10/1993 | Nally | 395/166 |
| 5,293,258 | 3/1994 | Dattilo | 358/518 |
| 5,309,257 | 5/1994 | Bonino et al. | 358/504 |
| 5,309,552 | 5/1994 | Horton et al. | 395/131 |

*Primary Examiner*—Phu K. Nguyen
*Attorney, Agent, or Firm*—Fitzpatrick, Cella, Harper & Scinto

[57] ABSTRACT

An image processing apparatus is arranged to store different types of image data containing color information so as to provide an image output, hold in a register display information corresponding to each of these types of stored image data, classifying the stored image data on the basis of the display information held in the register, and generate pixel data on the basis of the classified image data.

26 Claims, 25 Drawing Sheets

SCRIPT EXAMPLE OF COLOR DATA
M1 = 1, M0 = 1, STADR = n, BOFT = 3, ITER = 0

FIG. 5A

| M1 | M0 | STADR | BOFT | ITER |
|----|----|-------|------|------|
| 0  | 0  | A0    | 0    | 0    |
| 1  | 1  | A1    | α    | H    |
| 0  | 0  | A2    | α    | H    |

FIG. 5B

| M1 | M0 | STADR | BOFT | ITER |
|----|----|-------|------|------|
| 0 | 0 | A0 | 0 | 0 |
| 1 | 1 | A1 | β1 | 0 |
| 0 | 0 | A2 | β2 | 0 |
| 1 | 1 | A3 | β3 | 0 |
| 0 | 0 | A4 | β4 | 0 |
| 0 | 0 | ... | ... | . |
| ... | ... | ... | ... | . |
| 1 | 0 | An-1 | βn-1 | 0 |
| 0 | 0 | An | βn | 0 |

FIG. 5C

| LINE No. | M1 | M0 | STADR | BOFT | ITER |
|----------|----|----|-------|------|------|
| 1  | 0 | 0 | 0     | 0 | 0     |
| 2  | 1 | 1 | 19HEX | 6 | 13HEX |
| 3  | 0 | 0 | 1BHEX | 4 | 13HEX |
| 4  | 1 | 0 | 98HEX | 6 | 2     |
| 5  | 0 | 0 | 9AHEX | 1 | 4     |
| 6  | 1 | 0 | A2HEX | 5 | 4     |
| 7  | 1 | 0 | A7HEX | 4 | 1     |
| 8  | 0 | 0 | AEHEX | 0 | 2     |
| 9  | 1 | 0 | B1HEX | 3 | 1     |
| 10 | 0 | 0 | B2HEX | 7 | 3     |
| 11 | 0 | 0 | B7HEX | 6 | 1     |
| 12 | 1 | 0 | C0HEX | 2 | 4     |
| 13 | 1 | 0 | CAHEX | 1 | 2     |
| 14 | 0 | 0 | CBHEX | 2 | 1     |
| 15 | 1 | 0 | CEHEX | 7 | 1     |
| 16 | 0 | 0 | D0HEX | 1 | 2     |
| 17 | 0 | 0 | D5HEX | 0 | 1     |

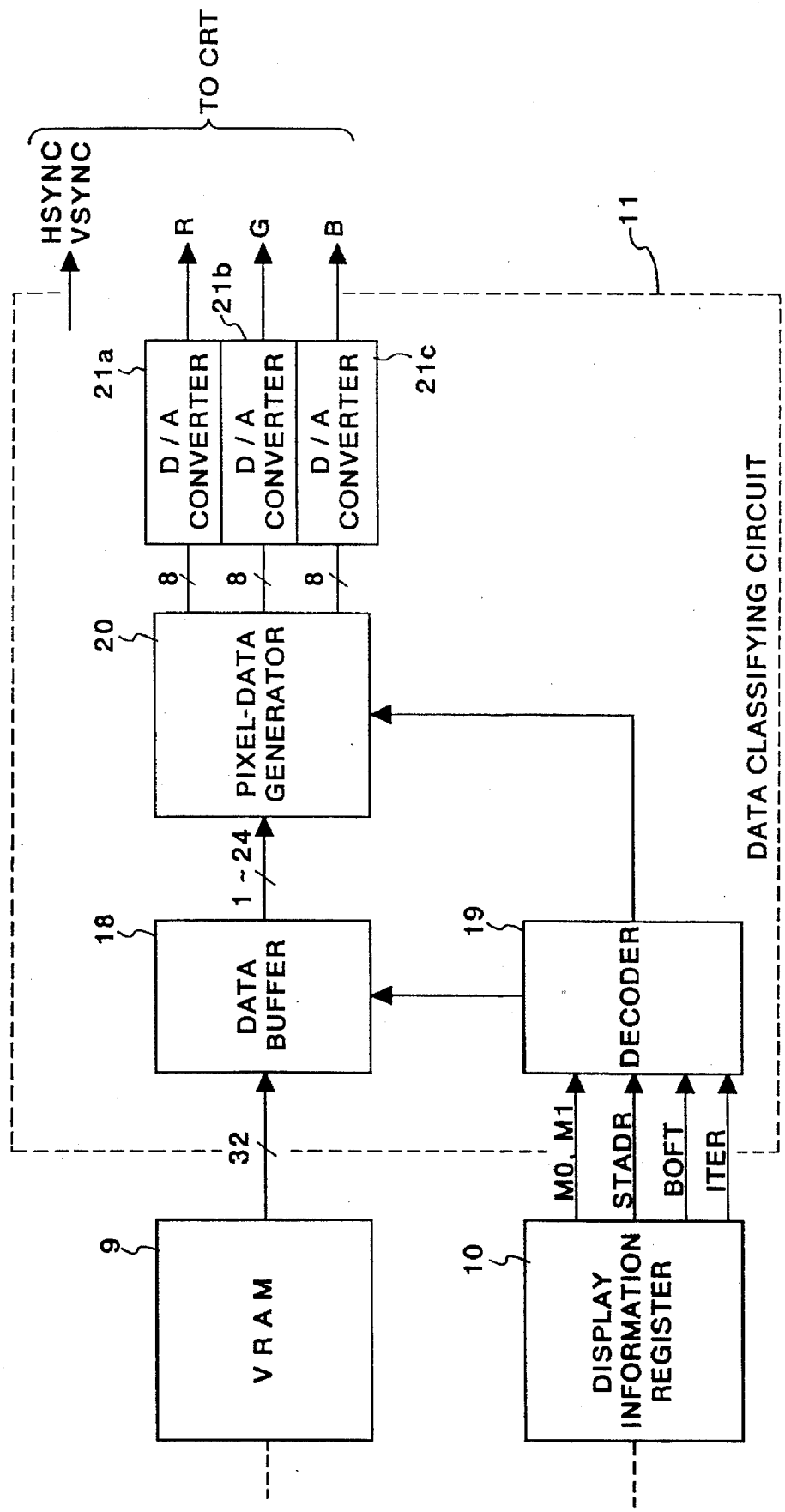
F I G. 8

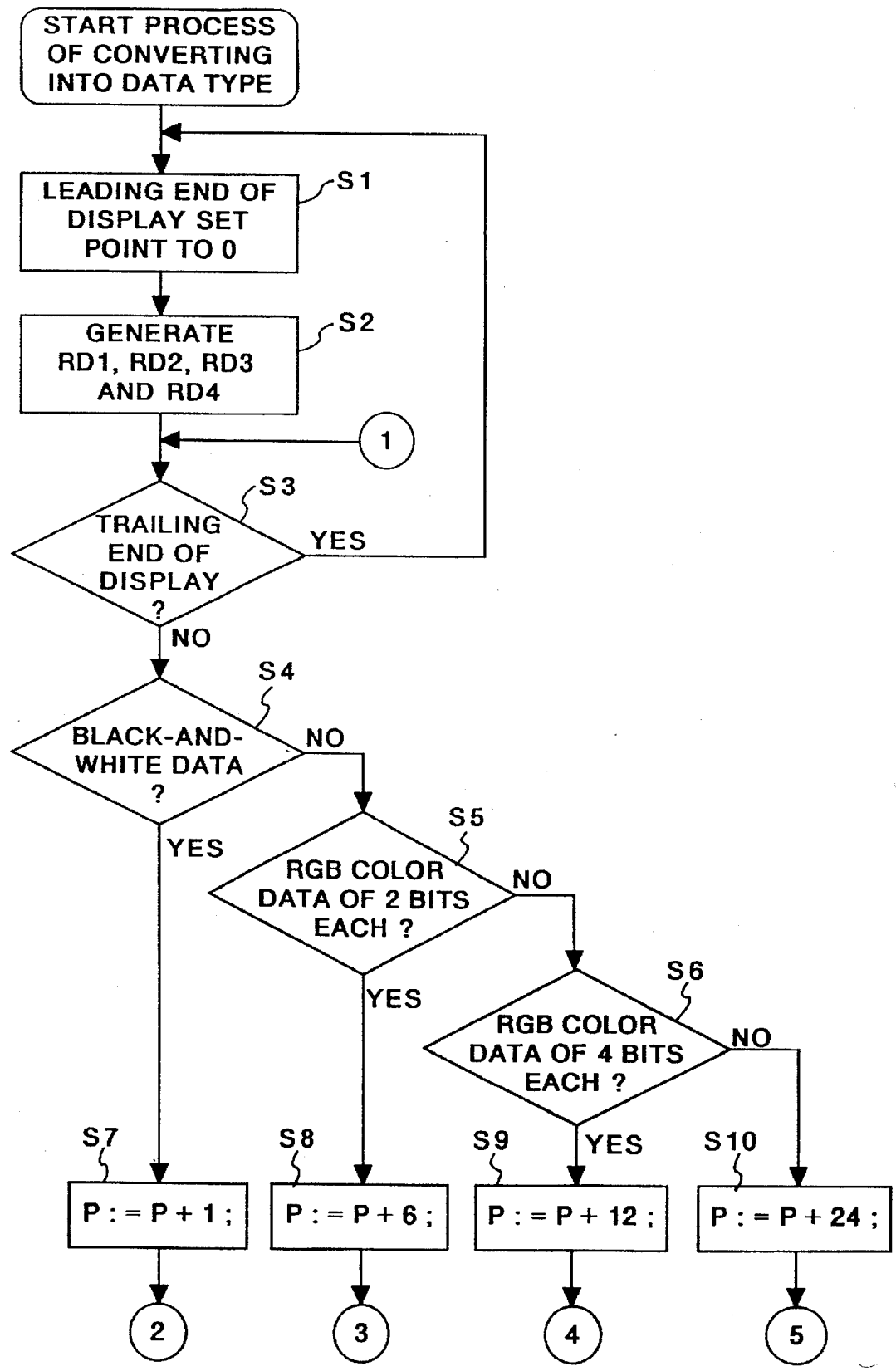
F I G. 10 A

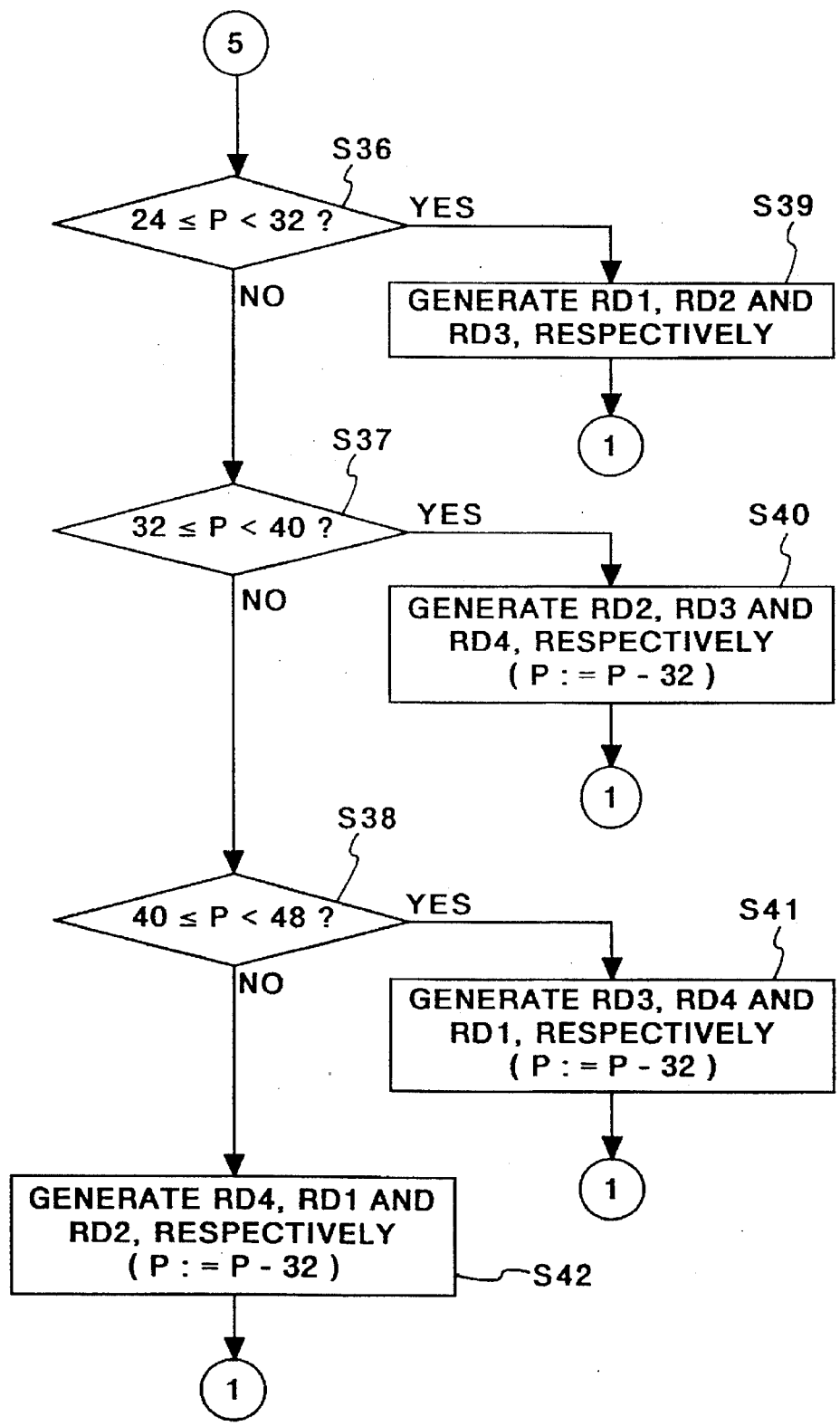
F I G. 10D

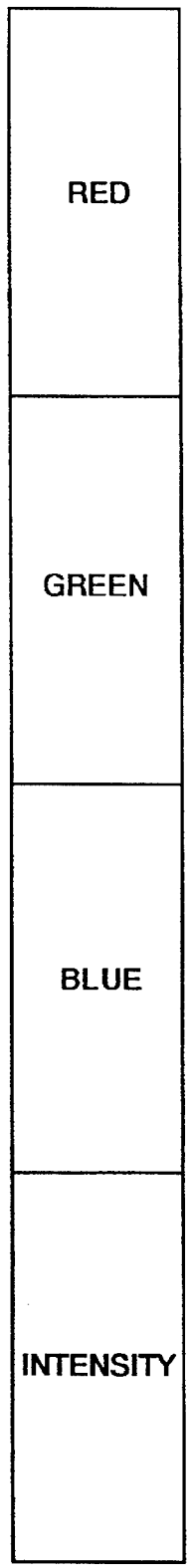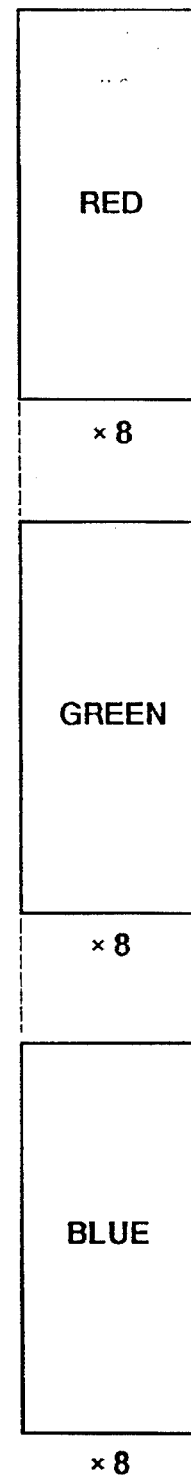
F I G. 14 A  F I G. 14 B

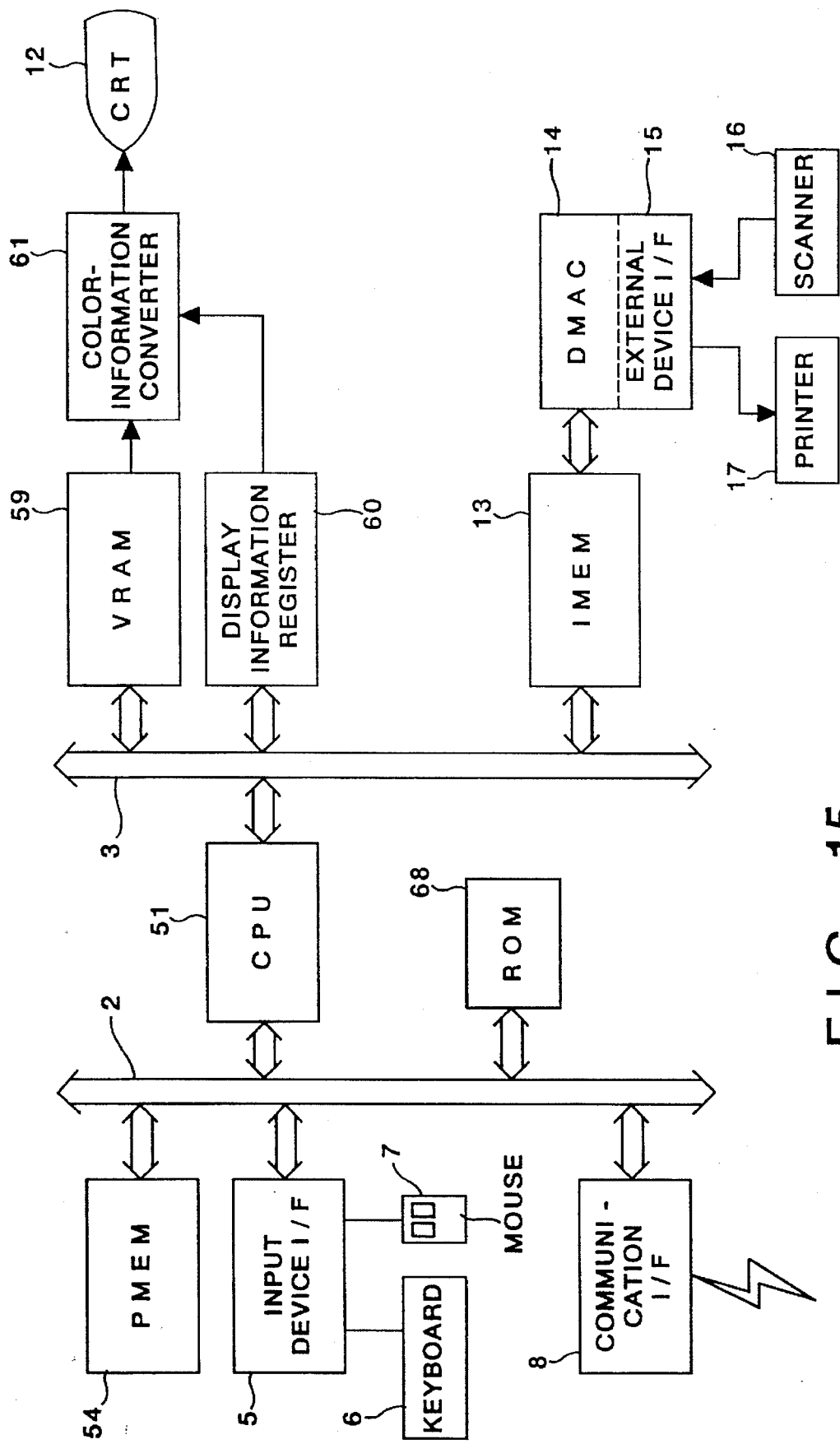
F I G. 15

SCRIPT EXAMPLE OF COLOR DATA
M1 = 1, M0 = 1, STADR = n, BOFT = 3, ITER = 0

FIG. 19A

| M1 | M0 | STADR | BOFT | ITER |
|----|----|-------|------|------|
| 0  | 0  | A0    | 0    | 0    |
| 1  | 1  | A1    | α    | H    |
| 0  | 0  | A2    | α    | H    |

FIG. 19B

| M1 | M0 | STADR | BOFT | ITER |
|----|----|-------|------|------|
| 0  | 0  | A0    | 0    | 0    |
| 1  | 0  | A1    | β1   | 0    |
| 0  | 0  | A2    | β2   | 0    |
| 1  | 0  | A3    | β3   | 0    |
| 0  | 0  | A4    | β4   | 0    |
| 1  | 0  | ...   | ...  | ...  |
| 0  | 0  | ...   | ...  | ...  |
| ...| ...| ...   | ...  | ...  |
| 1  | 0  | An-1  | βn-1 | 0    |
| 0  | 0  | An    | βn   | 0    |

FIG. 19C

| LINE No. | M1 | M0 | STADR  | BOFT | ITER  |
|----------|----|----|--------|------|-------|
| 1        | 0  | 0  | 0      | 0    | 0     |
| 2        | 1  | 1  | 19HEX  | 6    | 13HEX |
| 3        | 0  | 0  | 1BHEX  | 4    | 13HEX |
| 4        | 1  | 0  | 98HEX  | 6    | 2     |
| 5        | 0  | 0  | 9AHEX  | 1    | 4     |
| 6        | 1  | 0  | A2HEX  | 5    | 1     |
| 7        | 0  | 0  | A7HEX  | 4    | 2     |
| 8        | 1  | 0  | AEHEX  | 0    | 1     |
| 9        | 0  | 0  | B1HEX  | 3    | 3     |
| 10       | 1  | 0  | B2HEX  | 7    | 1     |
| 11       | 0  | 0  | B7HEX  | 6    | 4     |
| 12       | 1  | 0  | C0HEX  | 2    | 2     |
| 13       | 0  | 0  | CAHEX  | 1    | 1     |
| 14       | 1  | 0  | CBHEX  | 2    | 1     |
| 15       | 0  | 0  | CEHEX  | 7    | 2     |
| 16       | 1  | 0  | D0HEX  | 1    | 1     |
| 17       | 0  | 0  | D5HEX  | 0    | 1     |

IMAGE PROCESSING APPARATUS

This application is a continuation of application Ser. No. 08/044,082 filed Apr. 6, 1993, which is a continuation of application Ser. No. 07/450,927 filed Dec. 14, 1989, both now abandoned.

BACKGROUND OF THE INVENTION

1. Field of the Invention

The present invention relates generally to image processing apparatus and, more particularly, to an image processing apparatus of the type which is utilized as a workstation for displaying a color image or a multi-level image or which is suitable for use in desk top publishing (DTP) or the like.

2. Description of the Related Art

In conventional apparatus of this type, it is customary to organize the constitution of memory into a plurality of image frames in order to display a multi-level image on, for example, a color workstation.

The above conventional arrangement, however, has the following disadvantages.

The first disadvantage is that a large quantity of expensive memories are required to form a multi-level image and an increase in cost is therefore incurred.

The second disadvantage is that an unnecessarily long time is required for writing or rewriting of multi-level black-and-white data or binary-level image data.

The third disadvantage consists in the fact that the conventional arrangement requires the number of frame memories which allows for an output size accommodating a plurality of image frames. For instance, if a color image is to be partially inserted into an entire document as is often the case with DTP, black-and-white data occupies a substantial portion of the image data contained in the entire document and the number of redundant portions therefore increases in the aforesaid frame memories. As a result, a large number of memories are required, thus resulting in an increase in the manufacturing cost.

SUMMARY OF THE INVENTION

It is, therefore, an object of the present invention to solve the above-described problems.

It is another object of the present invention to provide an image processing apparatus which makes it possible to reduce the required memory size and to increase the use efficiency of memory.

It is another object of the present invention to provide an image processing apparatus which can compatibly accomplish a reduction in cost and an increase in throughput.

It is another object of the present invention to provide an image processing apparatus which can store different types of image data in the identical memory and which can display image data irrespective of the type thereof.

It is another object of the present invention to provide an image processing apparatus which can execute real-time conversion of various types of image data into video signals.

It is another object of the present invention to provide an image processing apparatus which can reduce the time period required to rewrite image data of the type which carries a relatively small amount of information.

It is another object of the present invention to provide an image processing apparatus which makes it possible to reduce the memory size required to provide a display of one image frame by storing different types of image data in mixed form, thereby realizing a memory constitution having an improved use efficiency and a reduced memory access time.

It is another object of the present invention to provide an image processing apparatus which is provided with memory means for storing different types of image data to be converted into an image output, the different types of image data containing color information, register means for holding image output information corresponding to each of the types of image data stored in the memory means, classifying means for classifying the types of image data stored in said memory means on the basis of the image output information held in the register means, and generating means for generating pixel data on the basis of the image data classified by the classifying means.

It is another object of the present invention to provide an image processing apparatus which is provided with memory means for storing different types of image data to be converted into an image output, the different types of image data containing color information, register means for holding image output information corresponding to each of the types of image data stored in the memory means, identifying means for identifying the types of image data stored in the memory means on the basis of the image output information held in the register means, converting means for effecting color conversion of the different types of image data stored in the memory means on the basis of the identified data types, and image-forming means for forming an output image on the basis of the image data subjected to the color conversion.

In one embodiment of the present invention, it possible to reduce the required memory size and also to increase the use efficiency of memory. It is also possible to store and display image data irrespective of the data type thereof. In addition, real-time conversion of an image of each data type into video signals is enabled, whereby it is possible to reduce the time required to rewrite image data of the data type which carries a relatively small amount of information.

In another embodiment of the present invention, since it is only necessary to access one byte with respect to black-and-white data of eight pixels, memory access time can be reduced and the memory size required to form one display frame can therefore be reduced. In consequence, the scale of the memory circuit can be made compact to achieve reductions in the complexity of the construction and the manufacturing cost of the apparatus.

Further objects, features and advantages of the present invention will become apparent from the following detailed description of embodiments of the present invention with reference to the accompanying drawings.

BRIEF DESCRIPTION OF THE DRAWINGS

FIGS. 5A, 5B and 5C are views which serve to illustrate the way of using the display information register in the first embodiment of the invention;

FIG. 8 is a block diagram showing the construction of the color-information converter used in the first embodiment of the invention;

FIGS. 10A to 10D are flow charts which serve to illustrate the process executed by the data buffer according to the first embodiment of the invention;

FIGS. 14A and 14B are views which serve to illustrate general forms of data allocation, respectively;

FIG. 15 is a block diagram which serves to illustrate the construction of a color-image processing apparatus to which a second embodiment of the invention is applied;

FIGS. 19A, 19B and 19C are views which serve to illustrate the way of using the display information register in the second embodiment of the invention;

DESCRIPTION OF THE PREFERRED EMBODIMENTS

Embodiments of the present invention will be described below with reference to the accompanying drawings.

<First Embodiment>

To begin with, examples of general image processing apparatus which are similar to a first embodiment of the invention are explained below with reference to FIGS. 11, 12 and 13.

Figure 11:
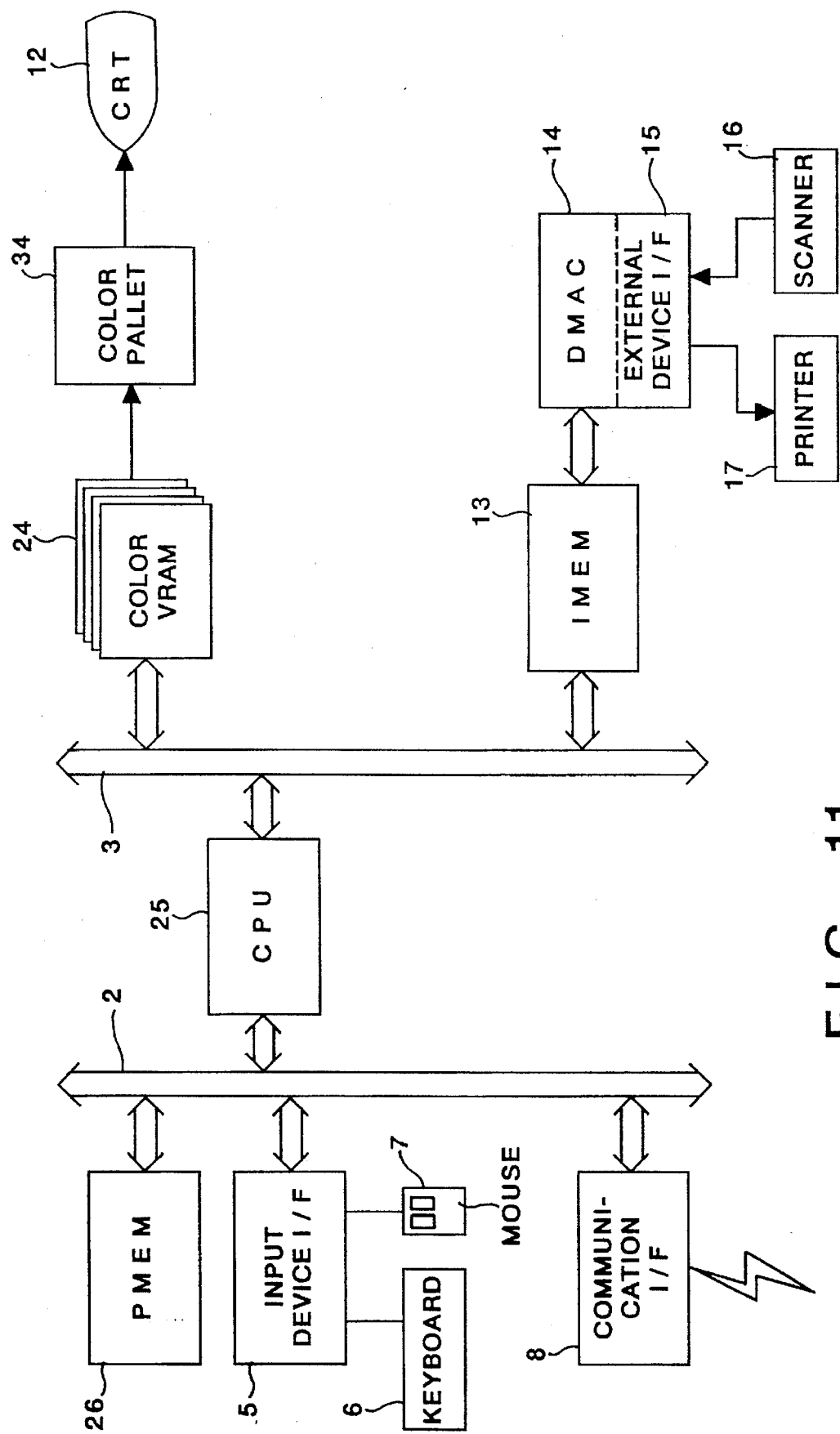
FIGS. 11, 12 and 13 are block diagrams which serve to illustrate the memory constitutions in general color workstations, respectively.
Figure 12:
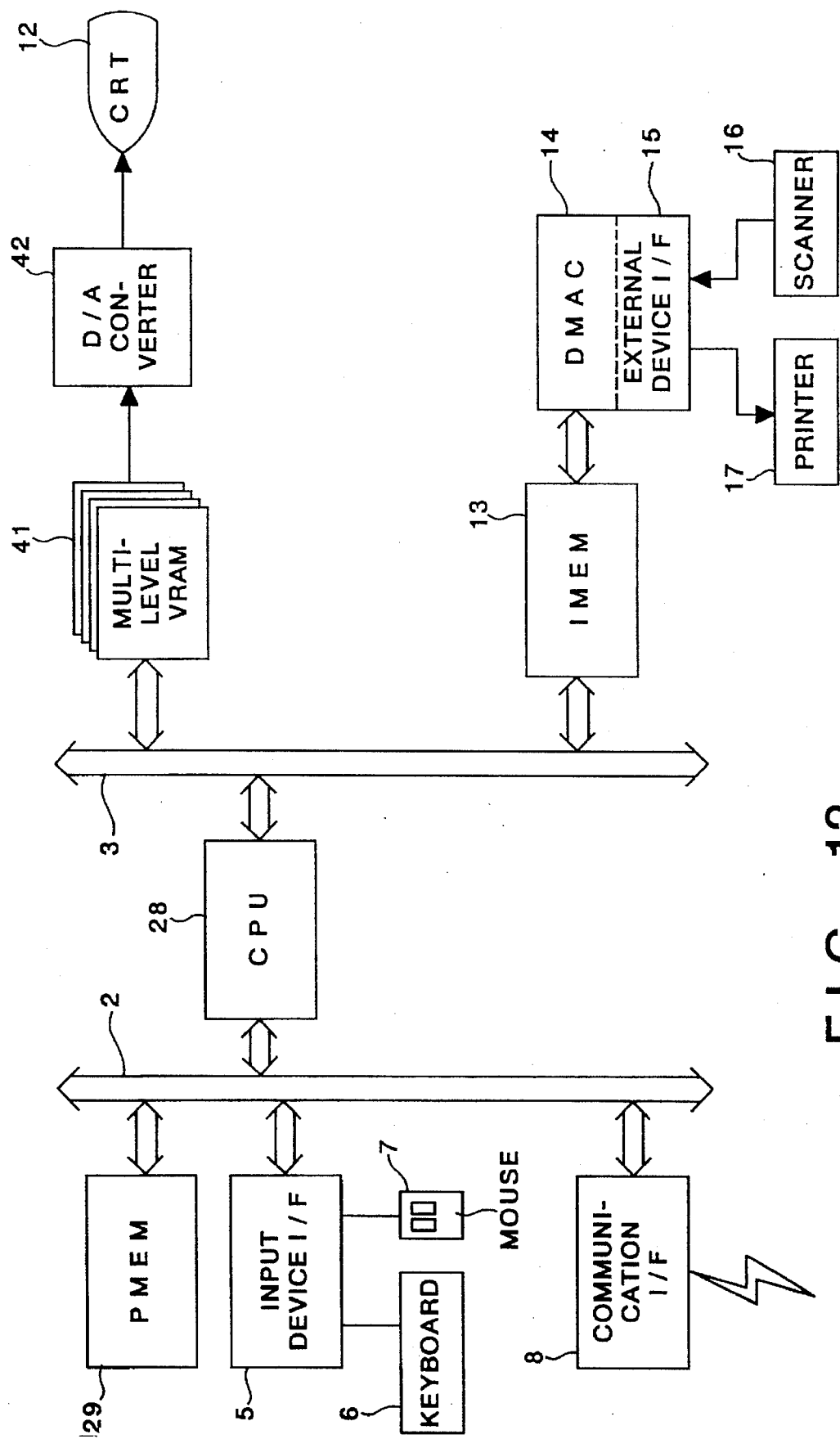
Figure 13:
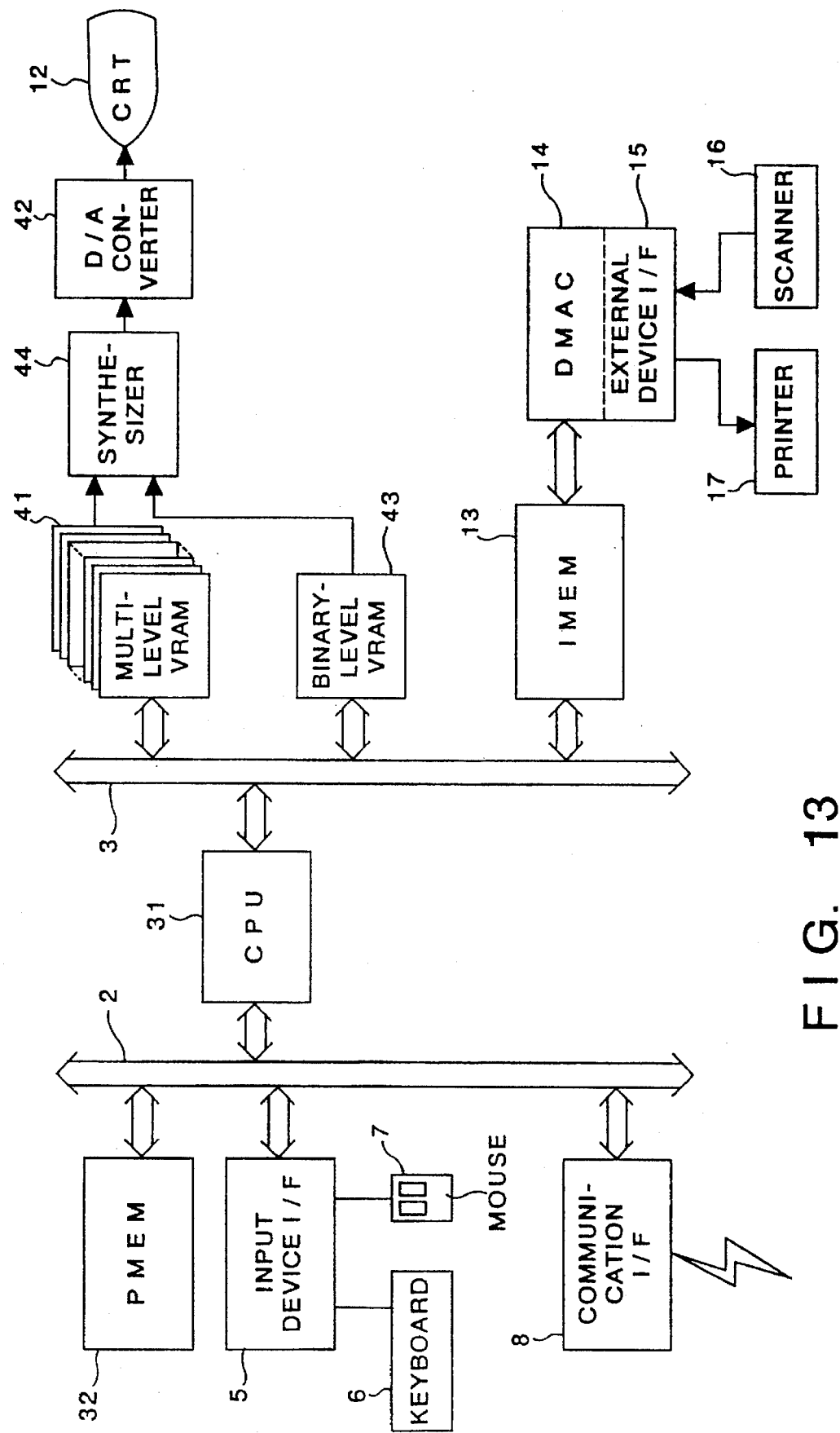

For example, the memory constitution of a specific color workstation may be organized into a plurality of image frames as shown in FIG. 11 as well as FIGS. 12 and 13 which serve to illustrate an arrangement for providing a multi-level image display.

The apparatus shown in FIG. 11 comprises a CPU 25 for controlling all the elements of the apparatus, a system bus 2 for transmission of address signals, control signals and the like, an image bus 3 for transmission of image data, a memory (PMEM) 26 for storing various programs such as control programs and error processing programs according to which the CPU 25 is operated, an input interface (I/F) 5, a keyboard 6 provided with various keys which are operated to input characters, commands or the like, a mouse 7 which is used to execute designation of a coordinate position or the like, the keyboard 6 and the mouse 7 being connected to the input device (I/F) 5, a communication interface (I/F) 8 of the general-purpose type which can support LAN, RS232C or the like, color VRAMs 24 serving as CRT-display memory having a memory size corresponding to four (or three) image frames, and a color pallet 34 for generating video information from the color data supplied from the color VRAMs 24 for four image frames. The general image-data processing apparatus shown in FIG. 12 also comprises a CRT 12, an image memory (IMEM) 13 which is used as a memory for storing image data, a DMA controller (DMAC) 14 for transferring image data between the IMEM 13 and an external device interface (I/F) 15 to which external devices such as a scanner 16, a printer 17 and the like are connected.

In the image data processing apparatus shown in FIG. 12, a CPU 28 executes each of the programs stored in a PMEM 29. In this arrangement, multi-level VRAMs 41 for accommodating a plurality of image frames are employed to form a multi-level image, and a D/A converter 42 is employed to convert the digital data of the multi-level VRAMs 41 into analog data.

In the image data processing apparatus shown in FIG. 13, a multi-level image and a binary-level image are stored in multi-level VRAMs 41 and a binary-level VRAM 43, respectively. These images are synthesized in a synthesizer 44 and the synthesized image is then converted from digital form to analog form by a D/A converter 42.

FIGS. 14A and 14B are views which serve to illustrate conventional types of data allocation. As shown in FIG. 14A, the image-data processing apparatus of FIG. 11 requires memory capable of storing at least four image frames corresponding to red, green, blue, and intensity, respectively. If the apparatus shown in FIG. 12 or 13 is employed to represent black-and-white tone data in sixteen steps of tone representation, the apparatus needs memory for accommodating four image frames. If such apparatus is employed to represent red, green and blue with 8 bits each, memory for twenty-four image frees (3×8) is needed as shown in FIG. 14B.

However, any of the aforesaid image processing apparatus has the following disadvantages.

The apparatus shown in FIG. 11 requires memory for R, G, B and I, that is, memory for a total of four image frames. In addition, if black-and-white data is to be represented, one bit of "0" or "1" needs to be expanded to four bits. As a result, an extremely long time is required for data writing.

As is apparent from the foregoing, the apparatus of FIG. 11 needs CRT-display memories corresponding to a plurality of image frees, and as the amount of information required to represent one pixel increases, the required memory size increases.

In FIG. 12, there is shown an arrangement in which binary-level image data is expanded to multi-level image data so that one pixel is represented with four bits, i.e., in sixteen steps of tone representation. If the tone reproduction is to be improved, a memory size capable of storing a larger number of image frames will be required. In other words, if one pixel is to be represented with 8 bits for each of R, G and B, a memory size for twenty-four image frames will be needed and the rate of data writing must be increased from one bit to twenty-four bits.

In the arrangement of FIG. 13, if a multi-level display area is limited to a small area, the multi-level VRAMs 41 need not necessarily have a memory size for four image frames. However, if a multi-level display is to be implemented over the entire display area, memory for a total of five image frames will be required. In addition, if full color reproduction is to be implemented with 8 bits for each of R, G and B, a memory size for twenty-five frames (8×3+1) will be required. To cope with such a large memory size, the synthesizer 44 may be provided with the synthesizing function of, for example, selectively switching multi-level data and binary-level data, or ORing multi-level and binary-level data. However, to achieve any of the synthesizing functions, a certain magnitude of circuit scale is required. As the number of bits required to represent one bit is increased, the circuit scale increases.

As is apparent from the foregoing, the image-data processing apparatus shown in FIG. 12 requires a large number of expensive memories for forming a multi-level image and therefore has the problem of incurring an increase in the manufacturing cost.

The image-data processing apparatus shown in FIG. 13 further has the disadvantage of requiring an unnecessarily long time to complete writing or rewriting of data which represents one pixel, even with a relatively small amount of information, for example, multi-level black-and-white image data or binary-level image data.

The following is a description of an image-data processing apparatus according to the first embodiment of the present invention. The first embodiment is an improvement over the general arrangements described above.

Figure 7:
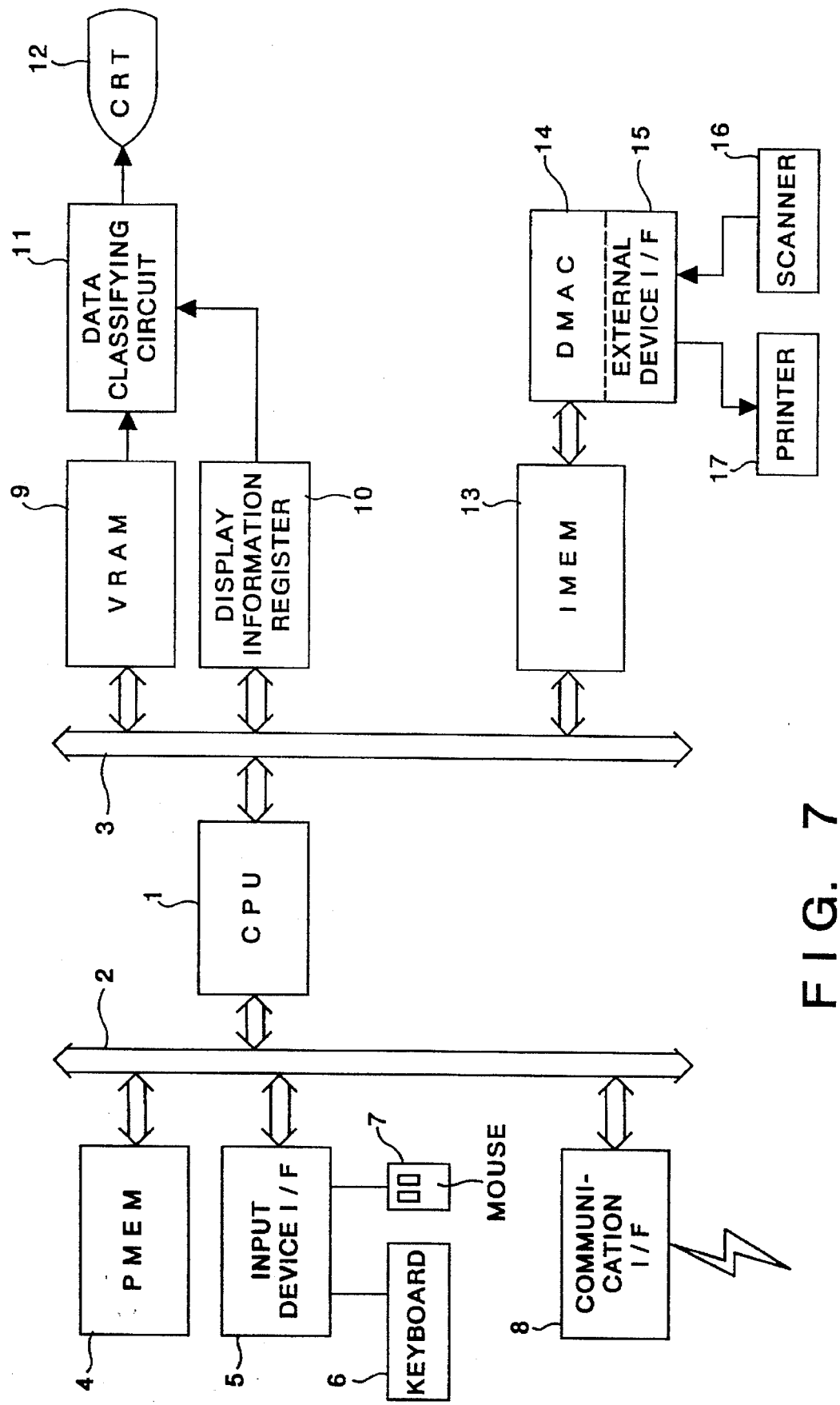
FIG. 7 is a block diagram showing the construction of a workstation to which the first embodiment of the invention is applied.

FIG. 7 is a block diagram showing the construction of a workstation to which the first embodiment of the present invention may be applied. In the following description, no explanation is given of units having a construction and a function similar to those of the corresponding units shown in FIGS. 11 to 13 mentioned above. The apparatus shown in FIG. 7 comprises a VRAM 9 serving as a CRT-display memory, a display information register 10 for storing information classifying the data stored in the VRAM 9, and a data classifying circuit 11 for converting the data stored in the VRAM 9 into black-and-white data or color data in accordance with the individual classified type. The apparatus also comprises a CPU 1 for controlling all the elements of this apparatus, a PMEM 4 for storing various programs such as the control programs required to operate the CPU 1, error processing programs, and a part of a program according to the flow chart shown in FIG. 9. The PMEM 4 is also employed as a work area or a temporary saving area during error processing.

The following is an explanation of a data structure for one pixel.

Figure 2A:
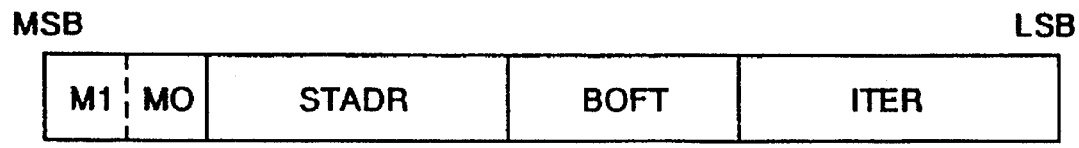
FIGS. 2A and 2B are views which serve to illustrate the details of the display information register used in the first embodiment of the invention.
Figure 2B:
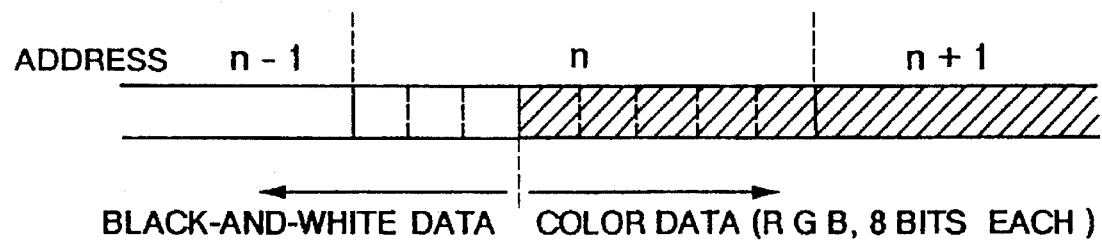

FIGS. 2A and 2B are views which serve to illustrate the details of the display information register 10. In FIG. 2A, M1 and M0 indicate flags which are used to discriminate between the types of black-and-white data and color data. In this display information register 10, when one pixel is to be represented, it is possible to select the desired pattern from among three patterns, that is, the pattern of assigning 2 bits to each of R, G and B data, the pattern of assigning 4 bits to each of R, G and B data, and the pattern of assigning 8 bits to each of R, G and B. STADR indicates a display start address at which display of image data is started and represents how many bytes of 8 bits each the display start address is away from the first address. BOFT indicates the position of the bit at which the image data starts in the byte which is indicated by the display start address STADR. If the region indicated by image data of the same type is a rectangular region, ITER indicates the number of lines in the rectangular region; otherwise, ITER indicates "0". This ITER also indicates the number of repetitions of image data of different types when such image data alternately appear at intervals of a predetermined period. The ITER serves to make unnecessary the operation of writing undividual values to a register each time the pitch address of the display frame is incremented, and also to reduce the memory size of the display information register 10. (Although the pitch address is "5" in the example shown in FIG. 4, the value of the pitch address may differ as required.) The above M1, M0, STADR, BOFT, and ITER are stored in the display information register 10 as display information. The following table 1 shows the manners of representation and corresponding data types based on the relationships between the flags M1 and M2.

TABLE 1

| M1 | M0 | Representation | Data Types |
| --- | --- | --- | --- |
| 0 | 0 | 1 bit/pixel | black and white |
| 0 | 1 | 6 bits/pixel | R, G and B of 2 bits each |
| 1 | 0 | 12 bits/pixel | R, G and B of 4 bits each |
| 1 | 1 | 24 bits/pixel | R, G and B of 8 bits each |

As shown in Table 1, in the first embodiment, the data structure is divided into four kinds.

For instance, if M1=1, M0=1, STADR=n, BOFT=3 and ITER=0, as shown in FIG. 2B color data is made available from the third bit in the eight bits of a display start address n and there is no rectangular area.

Figure 3A:
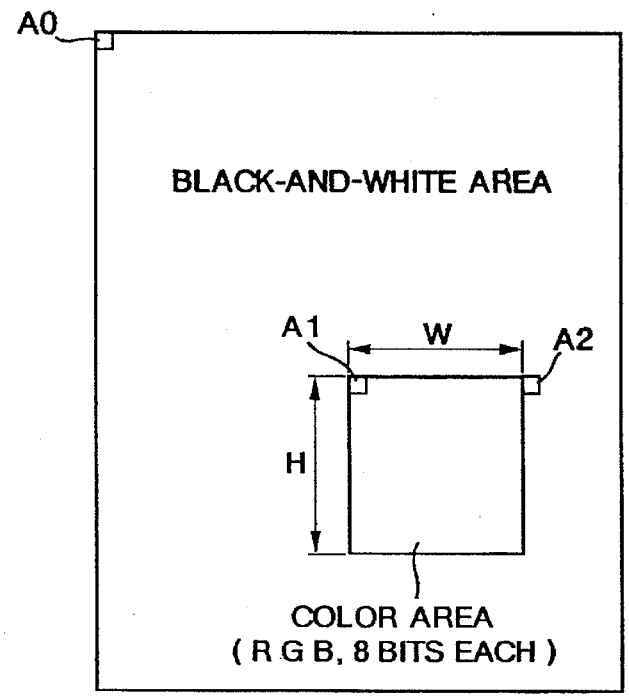
FIGS. 3A, 3B and 4 are views which serve to illustrate display examples in the first embodiment of the invention.
Figure 3B:
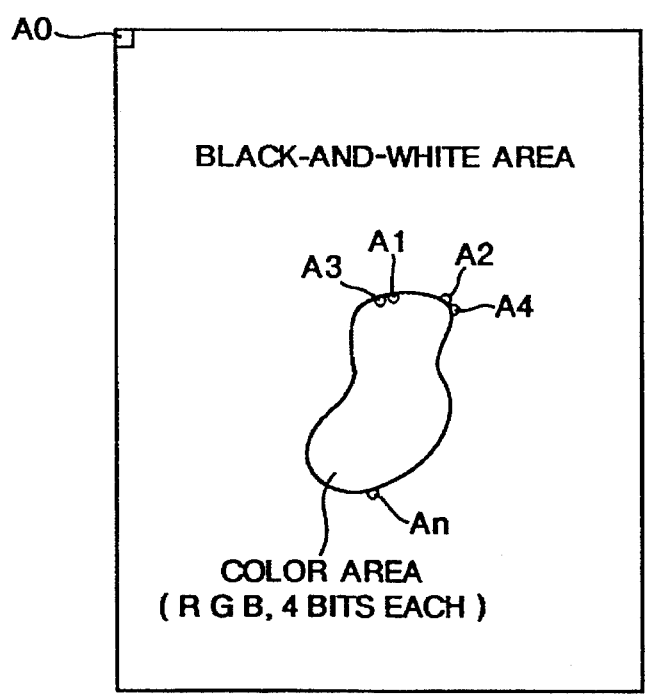
Figure 4:
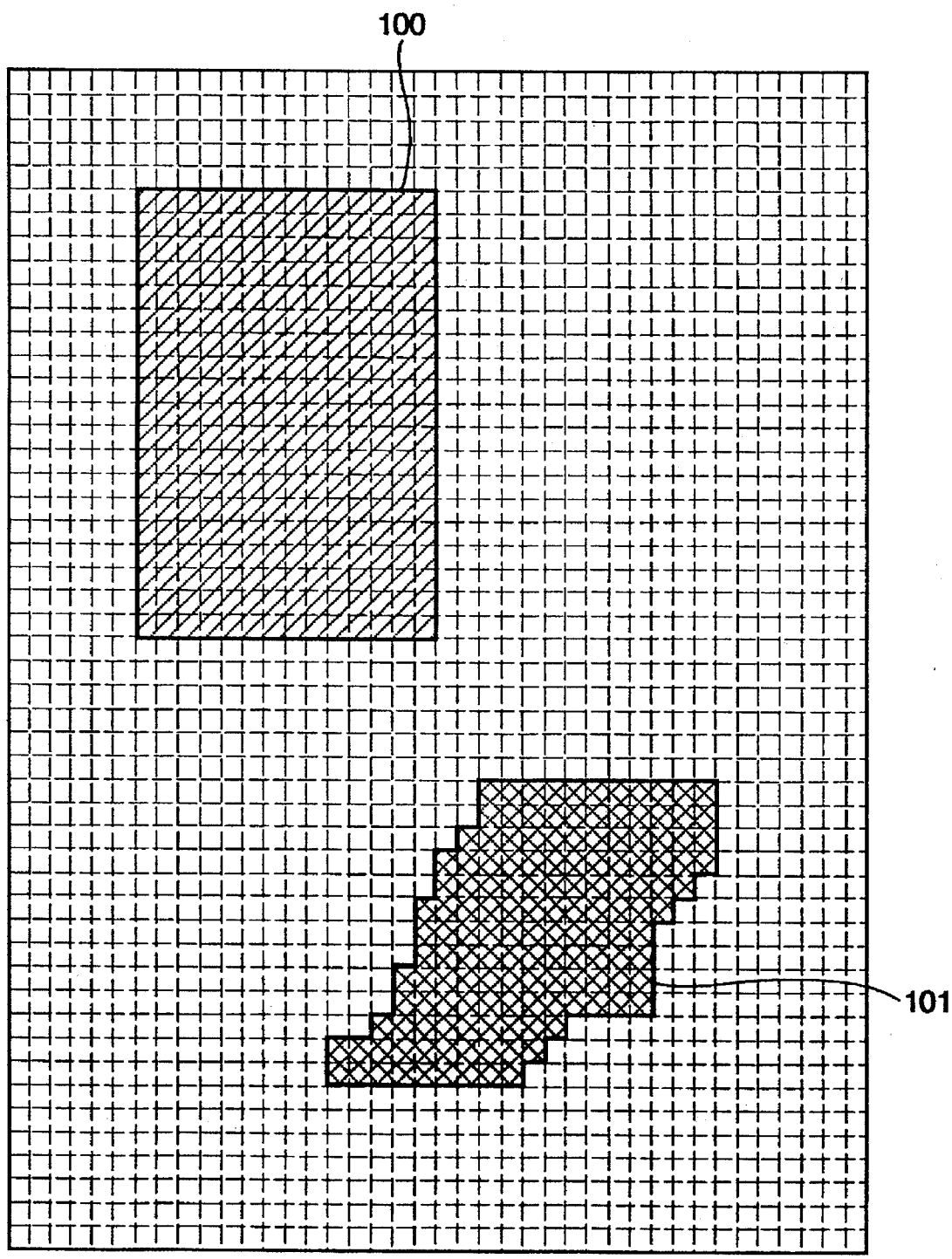
Figure 6A:
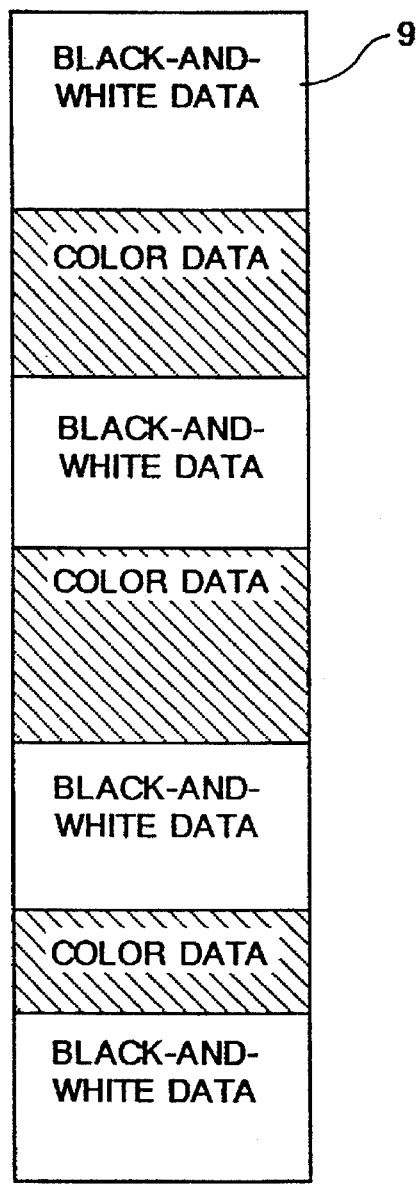
FIGS. 6A and 6B are views which serve to illustrate data allocation on the video random access memory (VRAM) used in first embodiment.
Figure 6B:

FIGS. 3A, 3B and 4 are views which serve to illustrate display examples provided by the first embodiment of the present invention. FIGS. 5A, 5B and 5C are views which serve to illustrate the way of using the display information register 10. FIGS. 6A and 6B are views which serve to illustrate data allocation in the VRAM 9.

If the display frames shown in FIGS. 3A, 3B and 4 are to be formed, black-and-white data and color data are stored on the VRAM 9 in a mixed form in accordance with the raster of the CRT 12 as shown in FIG. 6A. The respective display start addresses STADR for the black-and-white data and the color data are stored in the display information register 10 shown in FIG. 6B. To provide a display on the CRT 12, the image data is read from the VRAM 9 and fed to the data classifying circuit 11. The data classifying circuit 11 converts the black-and-white data and the color data of the image data so that both the image data match the interface of the CRT 12. Thereafter, the thus-converted image data is fed to the CRT 12.

To provide the display shown in FIGS. 3A, 3B and 4, scripts are written to the display information register 10 in the formats shown in FIGS. 5A, 5B and 5C.

For example, if a single rectangular color area is present in an entire black-and-white area as shown in FIG. 3A, a script of only three lines is required as shown in FIG. 5A. In this case, within a black-and-white image in which STADR is made A0, there exists a color image area in which a color image is formed over H lines in the sub-scan direction between A1 and A2 of STADR. As can be seen from FIG. 5A, the white-and-black image data is made available from bit "0" of address A0, while the color data is made available from bit "α" of address A1. In FIG. 3A, W represents the width of the color image in the main-scan direction. FIG. 3B shows a display frame in which a color image area surrounded by a curve is present in an entire black-and-white image image. In this case, as shown in FIG. 5B, the portion between A0 and An of the display start address STADR corresponds to image data containing display information, while β1 to βn in FIG. 5B indicate available bit positions in the byte of the black-and-white data or the color data in the respective display start addresses STADR.

A specific display example is explained with reference to FIG. 4.

In the display frame shown in FIG. 4, reference numeral 100 denotes a rectangular color image consisting of pixels of 8 bits each, and reference numeral 101 denotes a color image consisting of pixels of 4 bits each and having a configuration different from a rectangle. All the display information required to form the above display image can be represented by a script of only seventeen lines as shown in FIG. 5C. In FIGS. 4 and 5C, the first line in the display information stored in the display information register 10 represents that the black-and-white data starts from display start address STADR "0". The second line represents that the portion up to the sixth pixel in the eight bits of display start address STADR "19hex" corresponds to black-and-white data and that color data of R, G and B of 8 bits each continues from the seventh address over 19 (13hex) lines in the sub-scan direction. The third line represents that white-and-black data starts from the fifth bit in the display start address STADR "1Bhex", and this white-and-black data is repeated over 19 lines as described above. Accordingly, color data starts from the seventh bit in display start address STADR "1Ehex" which is a value obtained by adding "5", a pitch address (PA) in this example, to "19hex". Similarly, black-and-white data starts from the fifth bit in display start address STADR "20hex" which is a value obtained by adding the pitch address "5" to "1Bhex". In order to form the rectangular color image 100, the above-described process is repeated nineteen times.

As shown by the display information of the fourth line, black-and-white data continues from the fifth bit in display start address STADR "75hex" which corresponds to the last repetition step of the black-and-white data, to the sixth bit in display start address STADR "98hex". From the seventh bit in display start address STADR "98hex", color data of R, G and B of four bits each start. The display information is stored in the order: black-and-white data from the second bit in display start address STADR "9Ahex", color data from the seventh bit in display start address STADR "98hex+5(PA) =9Dhex", black-and-white data from the second bit in display start address STADR "9Ahex+5(PA)=9Fhex", color data from the sixth bit in display start address STADR "A2hex", black-and-white data from the second bit in display start address STADR "9Ahex+5(PA)+5(PA)=A4hex", color data from the fifth bit in display start address STADR "A7hex", black-and-white data from the second bit in display start address STADR "9Ahex+5(PA)+5(PA)+5(PA)=A9hex", color data from the fifth bit in display start address STADR "A7hex+5(PA)=AChex", and black-and-white data from the first bit in display start address STADR "AEhex" when the display information in the eighth line is reached. In a similar manner, the color image 101 is also formed. If the first address in memory on the VRAM 9 is represented by "#0hex", black-and-white data of 1 bit/pixel continues from "#0hex" to the sixth bit in "#19hex" and, from the seventh bit of "#19H", color data of 24 bits/pixel continues over 14 pixels, that is, 24×14=336 bits=42 bytes=2Ahex bytes. Accordingly, black-and-white data appears at the seventh bit in display start address STADR "19hex"+"2Ahex"="#43hex".

The above-described various image data are, as shown in FIGS. 6A and 6B, stored in the VRAM 9 and the display information register 10 in accordance with the allocation shown.

The following is an explanation of the data classifying circuit 11.

FIG. 8 is a view showing the construction of the data classifying circuit 11 used in the first embodiment of the present invention. In the figure, a data buffer 18 temporarily stores the image data read from the VRAM 9, and a decoder 19 decodes the data output from the display information register 10. A pixel-data generator 20 receives image data from the data buffer 18 in accordance with the result obtained by decoding in the decoder 19 (data type, display start address, and bit offset), and then outputs R, G and B signals of 8 bits each. If the data type of the image data decoded by the decoder 19 is (M1, M0)=(0, 0) which indicates black and white, image data for one bit is fed to the pixel-data generator 20. If the data type is (M1, M0)=(0, 1) which indicates R, G and B of 2 bits each, corresponding data for six bits is fed to the pixel-data generator 20. If the such data type is (M1, M0)=(0, 0) which indicates R, G and B of 4 bits each, corresponding data for twelve bits is fed to the pixel-data Generator 20. If the data type is (M1, M0)=(1, 1) which indicates R, G and B of 8 bits each, corresponding data for twenty-four bits is fed to the pixel-data generator 20. Accordingly, the data buffer 18 and the pixel-data generator 20 are physically connected by a 24-bit data bus. The available data width in this data bus dynamically varies between 1 bit and 24 bits in accordance with each data type. If the data classifying signal output from the decoder 19 is (M1, M0)=(0, 0) which indicates black and white, the pixel-data generator 20 references the leftmost one bit in the data supplied from the data buffer 18. The pixel-data generator 20 generates 8-bit data from each image data of R, G and B 8 so that if the image data referenced is "1", black is displayed; if it is "0", white is displayed. If the aforesaid data classifying signal is (M1, M0)=(0, 1) which indicates R, G and B of 2 bits each, the pixel-data generator 20 references the leftmost six bits (3×2 bits) in the image data supplied from the data buffer 18. The pixel-data generator 20 then generates R, G and B image data of 8 bits each by adding the rightmost six bits of each of R, G and B. If the aforesaid data classifying signal is (M1, M0)=(1, 0) which indicates R, G and B of 4 bits each, the pixel-data generator 20 references the leftmost twelve bits (3×4 bits) in the image data supplied from the data buffer 18. The pixel-data generator 20 generates R, G and B image data of 8 bits each by adding the rightmost four four bits of each of R, G and B. If the aforesaid data classifying signal is (M1, M0)=(1, 1) which indicates R, G and B of 8 bits each, the pixel-data generator 20 distributes the image data supplied from the data buffer 18 (24 bits) directly to R, G and B image data of 8 bits each.

D/A converters 21a, 21b and 21c convert to analog video signals the 8-bit digital video signals of R, G and B colors output from the pixel-data generator 20, respectively. The analog signals output from the respective D/A converters 21a to 21c are output to the CRT 12 together with synchronizing signals.

The following is an explanation of the data buffer 18.

Figure 1:
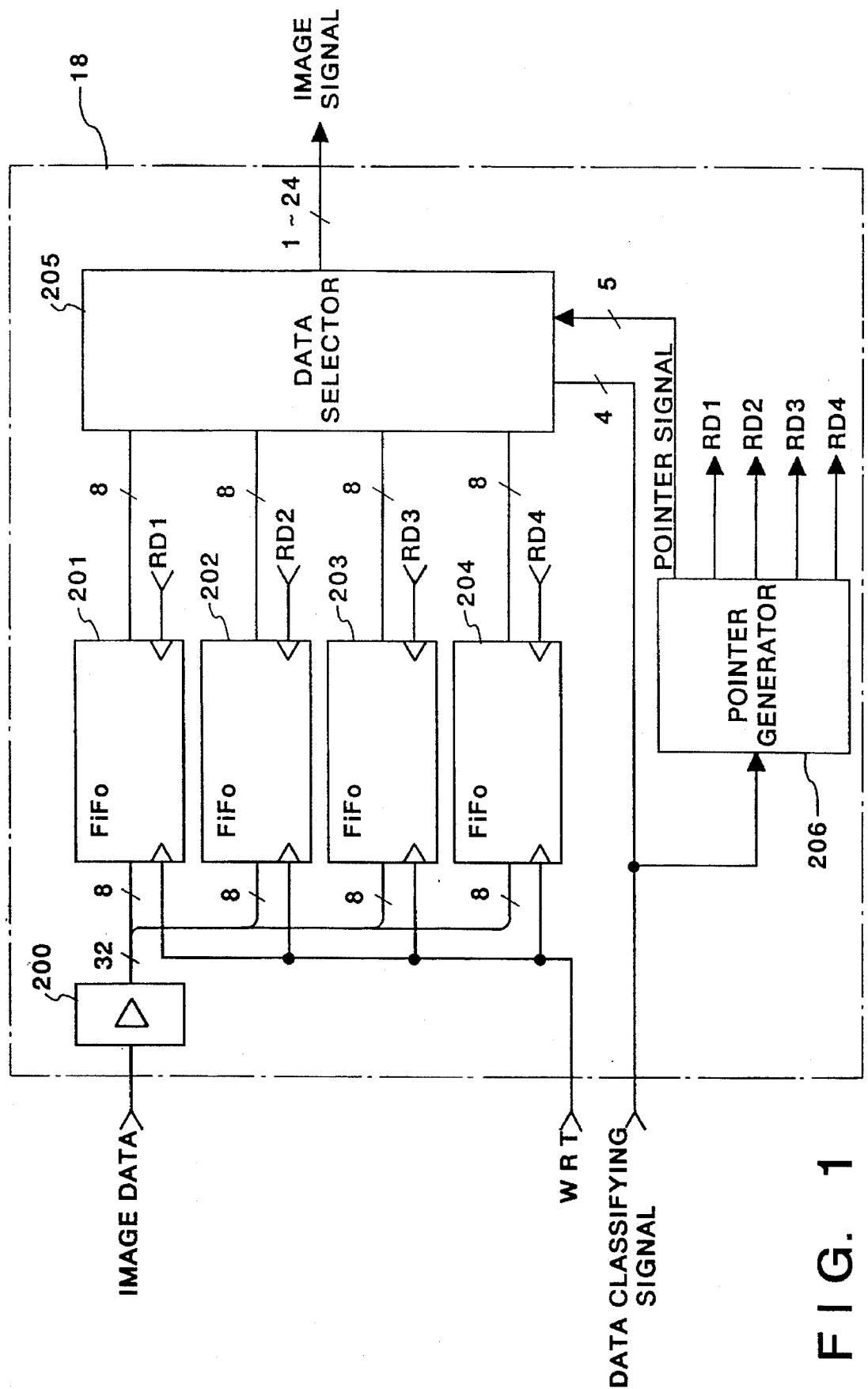
FIG. 1 is a circuit diagram schematically showing the arrangement of a data buffer according to a first embodiment of the present invention.

FIG. 1 is a circuit diagram schematically showing the construction of the data buffer 18 used in the first embodiment of the present invention. In FIG. 1, a data driver 200 outputs the image data supplied from the VRAM 9 to a plurality of first-in first-out memory circuits (FIFOs) 201–204 which follow the data driver 200. A data selector 205 latches the data output from the FIFOs 201–204 and selects and outputs a particular data type. A pointer generator 206 outputs a pointer signal on the basis of the data classifying signal output from the decoder 19. In this arrangement, the image data read from the VRAM 9 is input to the data driver 200, while write signals (hereinafter referred to simply as WRT) for executing writing of the image data output from the data driver 200 are input to FIFOs 201–204, respectively. RD1 to RD4 denote read signals for executing reading of data from FIFOs 201–204, respectively. The point generator 206 inputs to the data selector 205 a pointer signal which represents the current point in display. The data selector 205 outputs an image signal, and this image signal is fed to the pixel-data generator 20.

The following is the display operation executed in the first embodiment and the operation of the data buffer 18.

Figure 9:
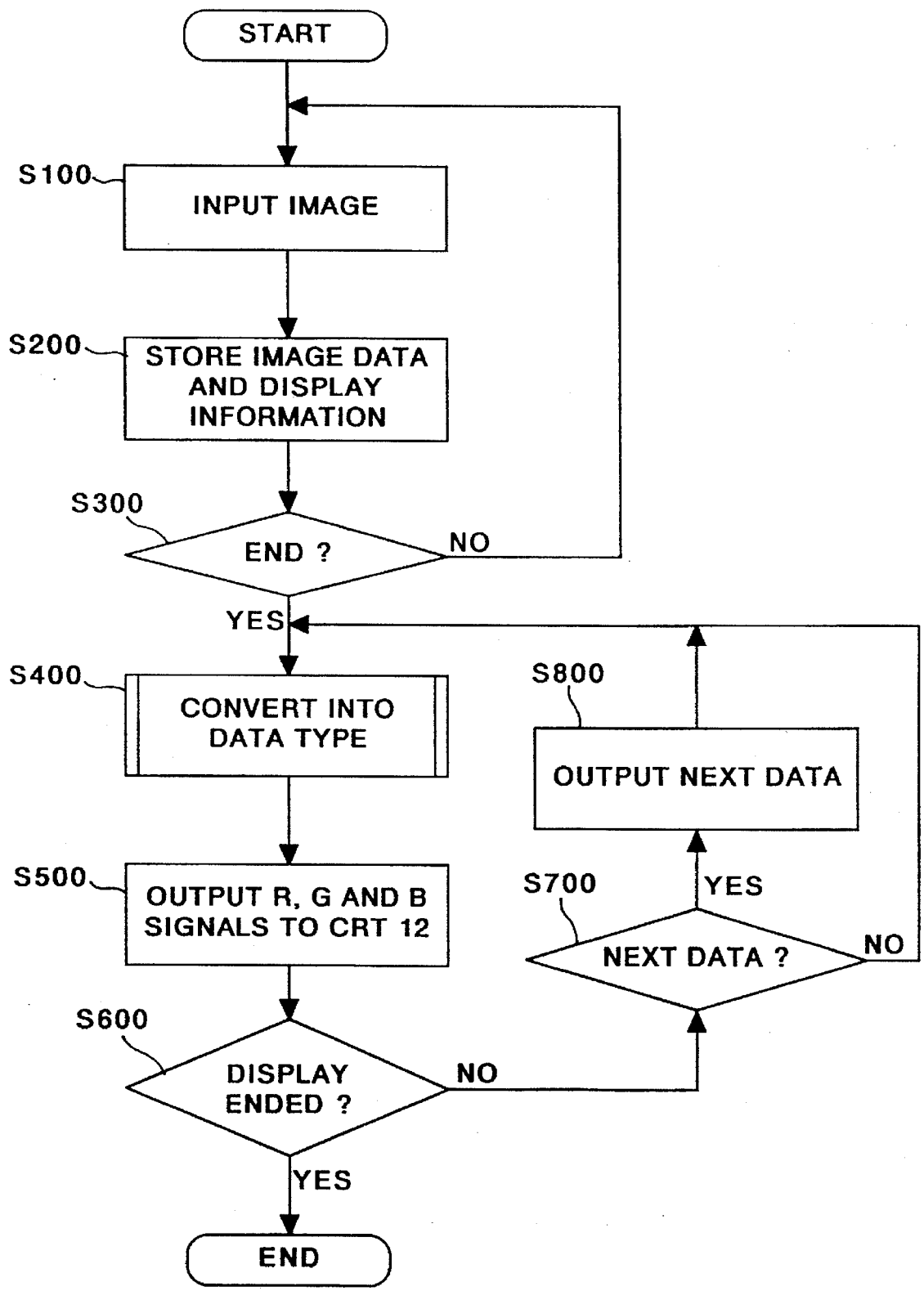
FIG. 9 is a flow chart which serves to illustrate the display process executed in the first embodiment of the invention.
Figure 10B:
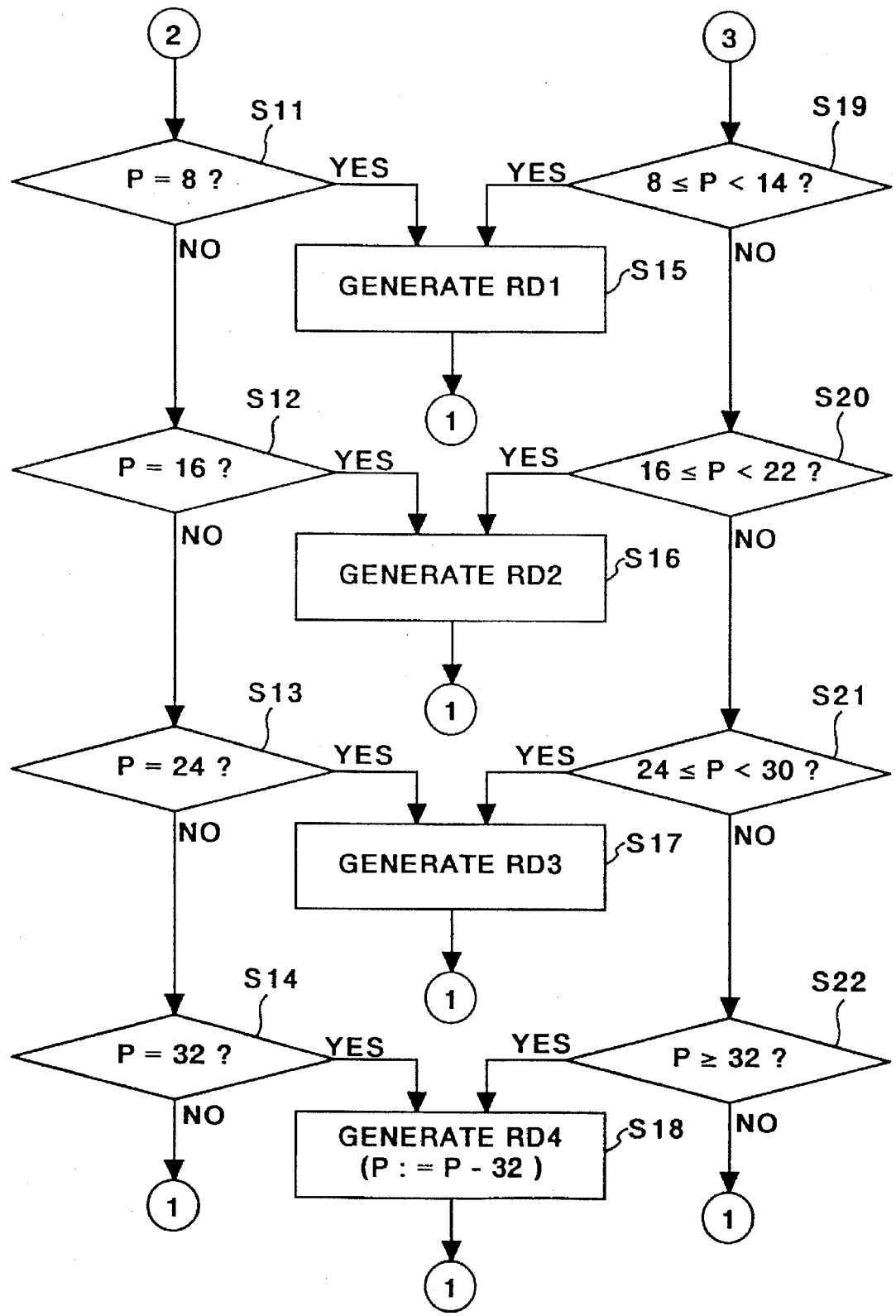
Figure 10C:
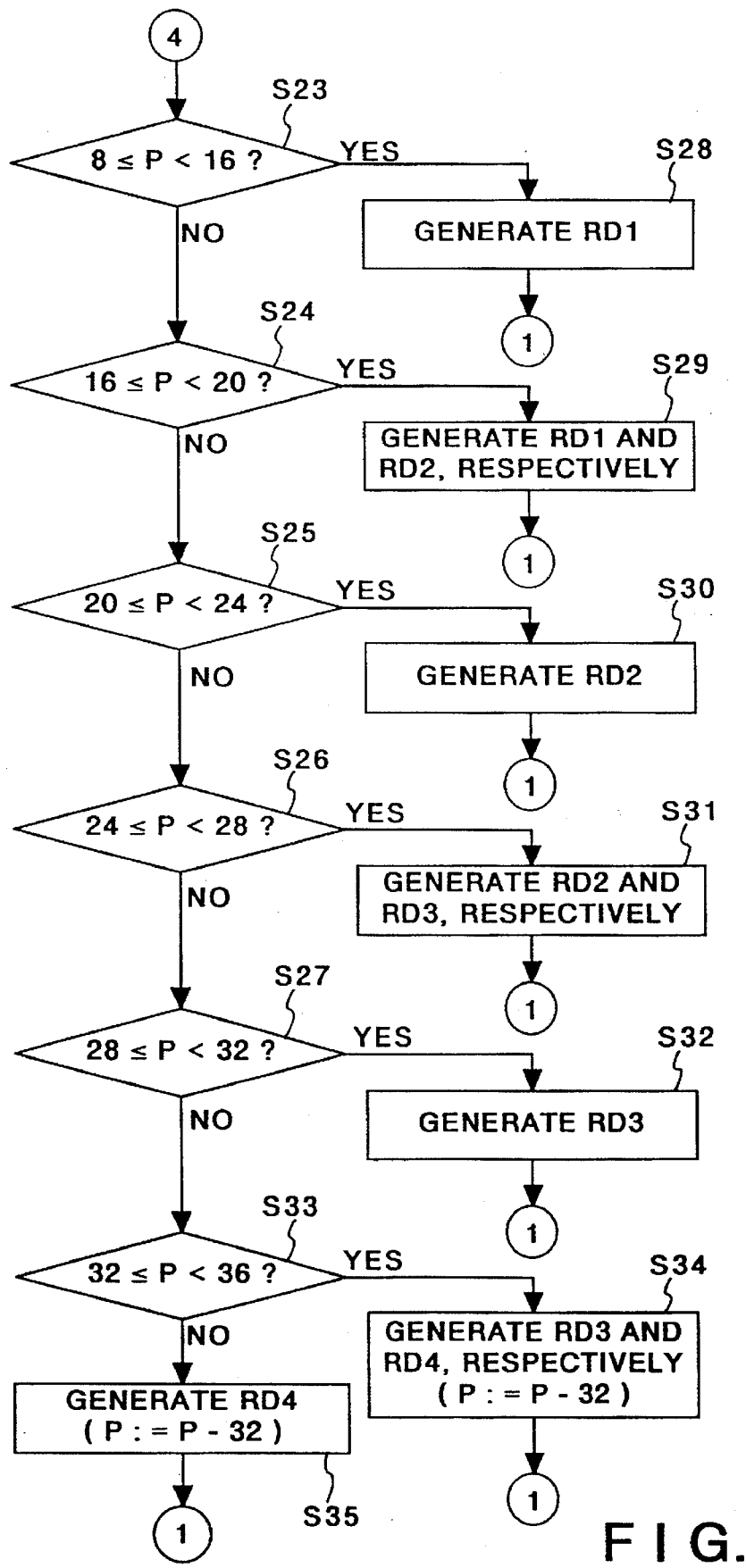

FIG. 9 is a flow chart which serves to illustrate the display process executed in the first embodiment of the present invention. FIG. 10A to 10D are flow charts which serve to illustrate the process executed by the data buffer 18.

To begin with, the related operation of the CPU 1 and the data classifying circuit 11 is explained with reference to FIG. 9. If a user is to form the desired image frame by means of character input or graphics input utilizing the keyboard 6 or the mouse 7, either of which is supported as one function of a word processor, image-forming application software, or image input employing the scanner 16, the CPU 1 expands the input image data on the VRAM 9 and, at the same time, display information of the format shown in FIG. 2A is stored in the display information resister 10 (Step S200, Step S300). In this manner, inputting of image data for one display frame is completed. In the meantime, for control of the CRT 12, the image data in the VRAM 9 and the display information in the display information register 10 are output to the data classifying circuit 11 (Step S400). Then, the data classifying circuit 11 identifies the type of the image data and classifies the image data to form predetermined R, G and B signals. These R, G and B signals are output to the CRT 12 (Step S500). In the case of image data of different types, the next display information is read out, and the conversion process starting with Step S400 is repeated (Steps S400, S500, S600, S700 and S800). In the case of image data of the same type, image data of a similar type is output to the CRT 12 (Steps S400, S500, S600 and S700). In this manner, a display image for one image frame is formed on the CRT 12. Although the control of the CPU 1 and the control of the CRT 12 are independently executed in practice, the above explanation refers to serial operation for the purpose of illustration only.

The process of the data buffer 8 which is executed in Step S400 is explained in detail with reference to FIGS. 10A–10D.

First of all, to represent the leading position in the display frame, a pointer address (pointer P) is set to "0" in the pointer generator 206 (Step S1) and, in addition, the read signals RD1, RD2, RD3 and RD4 shown in FIG. 1 are generated. The read signals RD1, RD2, RD3 and RD4 are output to the corresponding FIFOs 201 to 204, and image data for 4 bytes is read from each of the FIFOs 201 to 204 and latched by the data selector 205 (Step S5). If it is determined in Step S4 that the data classifying signal indicates black-and-white data, the data selector 205 outputs to the pixel-data generator 20 only one bit of the image data indicated by a pointer signal (pointer p) as image data. Thereafter, the process proceeds to Step S7, where the value of the pointer P is incremented by one. Then, the process proceeds to Step S11. In the case of black-and-white data, if the value of the pointer P is smaller than 8, then after the aforesaid step S7 has been completed, the process returns to Step S3 (Steps S3, S4, S7, S11, S12, S13 and S14). When the value of the pointer P reaches 8, the pointer generator 206 generates the read signal RD1 and the data selector 205 reads and latches the image data of FIFO 201 (Steps S11 and S15). Similarly, for the case when P=16, the pointer generator 206 generates the read signal RD2 and the data selector 205 reads and latches the image data of FIFO 202 (Steps S12 and S16). For the case when P=24, the pointer generator 206 generates the read signal RD3 and the data selector 205 reads and latches the image data of FIFO 203 (Steps S13 and S17). For the case when P=32, the pointer generator 206 generates the read signal RD4 and the data selector 205 reads and latches the image data of FIFO 204 (Steps S14 and S18). At this time, 32 is subtracted from the value of the pointer P.

It is to be noted that the writing of image data from the VRAM 9 to each of the FIFOs 201–204 is executed independently of the generation of each of the above read signals RD1 to RD4.

Next, if it is determined in Step S5 that the data classifying signal represents 2-bit image data of R, G and B colors each, the data selector 205 outputs 6-bit image data from the position indicated by the position P. Then, the process proceeds to Step S8, where 6 is added to the value of the pointer P. At this time, if P<8, the process returns to Step S3 (Steps S19, S20 and S22). If $8 \leq P<14$ (Step S19), the pointer generator 206 generates the read signal RD1, FIFO 201 latches the next image data, and the process returns to Step S3 (Steps S19 and S15). Similarly, if $16 \leq P<22$, the pointer generator 206 generates the read signal RD2, the data selector 205 latches the next image data from FIFO 202, and the process returns to Step S3 (Steps S20 and S16). If $24 \leq P<30$, the pointer generator 206 generates the read signal RD3, the data selector 205 latches the next image data from FIFO 203, and the process returns to Step S3 (Steps S21 and S17). If $P \geq 32$, the pointer generator 206 generates the read signal RD4, the data selector 205 latches the next image data from FIFO 204, and the process returns to Step S3 (Steps S22 and S18). Although not specifically explained, if $14 \leq P<16$, $22 \leq P<24$, and $30 \leq P<32$, the process returns to Step S3 without executing any of the above steps.

In the next step S6, if it is determined that the data classifying signal represents 4-bit image data of R, G and B colors each, the data selector 205 outputs 12-bit image data from the position indicated by the pointer P. The process then proceeds to Step S9, where 12 is added to the value of the pointer P. At this time, since there is no case where P<8, if $8 \leq P<16$, this means that the data of FIFO 201 has been output. Accordingly, the pointer generator 206 generates the read signal RD1, and the process returns to Step S3 (Step S23 and Step S28). If $16 \leq P<20$, this means that the image data of both FIFO 201 and FIFO 202 have been output. In this case, the pointer generator 206 generates the read signals RD1 and RD2, the data selector 205 receives and latches 2-byte image data from the respective FIFOs, and the process returns to Step S3 (Step S24 and Step S29). Similarly, if $20 \leq P<24$, the pointer generator 206 generates the read signal RD2, the data selector 205 receives and latches 2-byte image data from the respective FIFOs, and the process returns to Step S3 (Step S25 and Step S30). If $24 \leq P<28$, the pointer generator 206 generates the read signals RD2 and RD3, the data selector 205 receives and latches image data from the respective FIFOs, and the process returns to Step S3 (Step S26 and Step S31). If $28 \leq P<32$, the pointer generator 206 generates the read signal RD3, the data selector 205 receives and latches image data from FIFO 203, and the process returns to Step S3 (Step S27 and Step S32). If $32 \leq P<36$, the pointer generator 206 generates the read signals RD3 and RD4, the data selector 205 receives and latches image data from the respective FIFO, and the process proceeds to Step S3 (Step S33 and Step S34). If $P \geq 36$, the pointer generator 206 generates the read signal RD4, and the data selector 205 subtracts 32 from the value of the pointer P and receives and latches image data from FIFO 204. The process proceeds to Step S3 (Step S33 and Step S35).

If it is determined in Step S4 that the data classifying signal represents 8-bit image data of R, G and B colors each, the data selector 205 outputs 24-bit (3-byte) image data from the position indicated by the position P. In this case, the process proceeds to Step S10, where 24 is added to the value of the pointer P (Steps S6 and S10). As for the pointer P, since there is no case where P<24, if 24≦P<32, the pointer generator 206 generates the read signals RD1, RD2 and RD3 and image data for three bytes are latched by each FIFO. At the same time, the data selector 205 receives and latches 3-byte image data from the respective FIFOs. The process then proceeds to Step S3 (Step S36 and Step S39). If 32≦P<40, the pointer generator 206 generates the read signals RD2, RD3 and RD4, the data selector 205 receives and latches image data from the respective FIFOs, and the process returns to Step S3 (Step S37 and Step S40). If 40≦P<48, the pointer generator 206 generates the read signals RD1, RD3 and RD4, the data selector 205 receives and latches image data from the respective FIFOs, and the process proceeds to Step S3 (Step S38 and Step S42). If P≧48, the process proceeds to Step S4, where the pointer generator 206 generates the read signals RD1, RD2, and RD4, and the data selector 205 subtracts 32 from the value of the pointer P and receives and latches image data from the respective FIFO. The process then returns to Step S3 (Step S38 and Step S42).

In the above, the above operations are repeated until the trailing end of the display frame is reached. If a display of one image frame has been completed, in order to display the next image frame, the pointer P is, as shown in Step S1, cleared at the leading position on the display frame. Then, the next display process up to the trailing end of the display frame is started.

With the display method employing the process described above, it is possible to realize a real-time CRT display from the image data stored on the VRAM 9 no matter how the four types of image data, that is, black-and-white image data, R, G and B color image data of 2 bits each, R, G and B color image data of 4 bits each, and R, G and B color image data of 8 bits each may be mixed.

As is apparent from the foregoing, with the first embodiment, it is possible to provide the following advantages.

(1) It is possible to reduce the required memory size and also to increase the use efficiency of memory.
(2) It is possible to store and display image data irrespective of the data type thereof.
(3) It is possible to realize real-time conversion of image of each data type into video signals.
(4) It is possible to reduce the time required to rewrite image data of the data type which carries a relatively small amount of information.

The present invention is similarly applicable to the case where a binary-level image and a multi-level image are mixed, in addition to the above case where a black-and-white image and a color image are mixed. In addition, the present invention can be applied not only to CRT displays but also to the processing of outputs to color printers or multilevel printers.

<Second Embodiment>

A second embodiment of the present invention is explained with reference to the accompanying drawings.

Incidentally, since an example of a general image processing apparatus which corresponds to the second embodiment of the present invention is similar to the first embodiment, no further explanation is given.

FIG. 15 is a block diagram showing the construction of a color image processing apparatus to which the second embodiment of the present invention may be applied. In the following description, no explanation is given of units which have constructions and functions similar to those of the corresponding units shown in FIG. 7. The apparatus shown in FIG. 15 comprises a VRAM 59 serving as a CRT display memory, a display information register 60 for storing data types or other information in the VRAM 59, and a color information converter 61 for converting the image data stored in the VRAM 59 into each signal of R, G and B. The color-information converter 61 performs data-classification conversion and color conversion. The apparatus shown also comprises a CPU 51 for controlling all the elements of the apparatus, a memory (PMEM) 54 for storing various programs such as control programs for operating the CPU 51, error processing programs, and a program according to the flow chart of FIG. 22. A boot-strap ROM 68 stores a start-up program which works when power is switched on.

The following is an explanation of a data structure for one pixel.

Figure 16A:
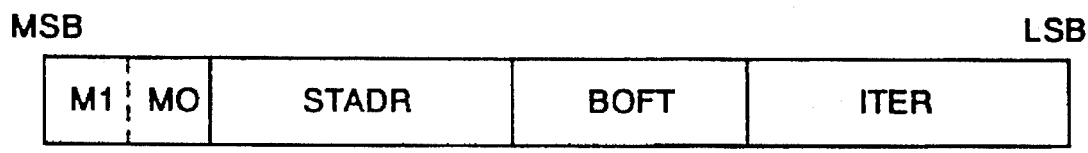
FIGS. 16A and 16B are views which serve to illustrate the details of the display information register used in the second embodiment.
Figure 16B:
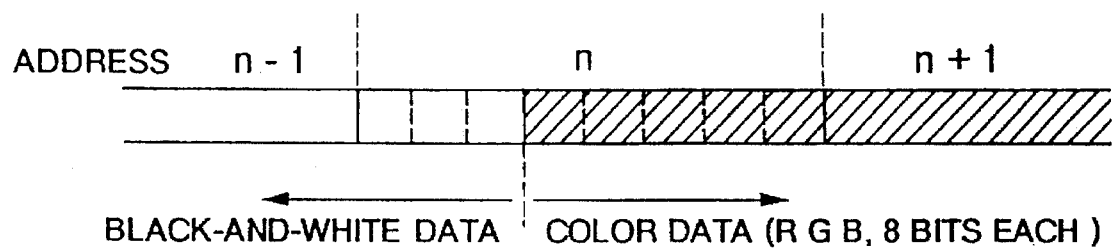

FIGS. 16A and 16B are views which serve to illustrate the details of the display information register 60. In FIG. 16A, M1 and M0 indicate flags which are used to discriminate between the types of black-and-white data and color data. In this display information register 60, when one pixel is to be represented (although handling of color data will be explained later), it is possible to select the desired pattern from among three patterns, that is, the pattern of assigning 2 bits to each of R, G and B image data, the pattern of assigning 4 bits to each of R, G and B image data, and the pattern of assigning 8 bits to each of R, G and B image data. STADR indicates a display start address at which display of image data is started and indicates how many bytes of 8 bits each the display start address is away from the first address. BOFT indicates the position of the bit at which image data becomes available in the byte which is indicated by the display start address STADR. If the area indicated by image data is a rectangular area, ITER indicates the number of lines in the rectangular area; otherwise, ITER indicates "0". This ITER indicates the number of repetitions of image data of different types when such image data alternately appear at an interval of a predetermined period. The ITER serves to omit the operation of writing to a register value each time the pitch address (P) of a display frame is incremented, and also to reduce the memory size of the display information register 60. The above M1, M0, STADR, BOFT, and ITER are stored in the display information register 60 as display information. The following table 2 shows the manners of representation and data types based on the relationships between the flags M1 and M2.

TABLE 2

| M1 | M0 | Representing | Data Types |
|----|----|----|----|
| 0 | 0 | 1 bit/pixel | black and white |
| 0 | 1 | 6 bits/pixel | R, G and B of 2 bits each |
| 1 | 0 | 12 bits/pixel | R, G and B of 4 bits each |
| 1 | 1 | 24 bits/pixel | R, G and B of 8 bits each |

As shown in Table 2, in the second embodiment, the data structure is divided into four kinds. The above table 2 is applicable to black-and-white tone data or other representation methods. For instance, if M1=1, M0=1, STADR=n, BOFT=3 and ITER=0, as shown in FIG. 2B color data is made available from the third bit in the eight bits of a display start address n and there is no rectangular region.

Figure 17A:
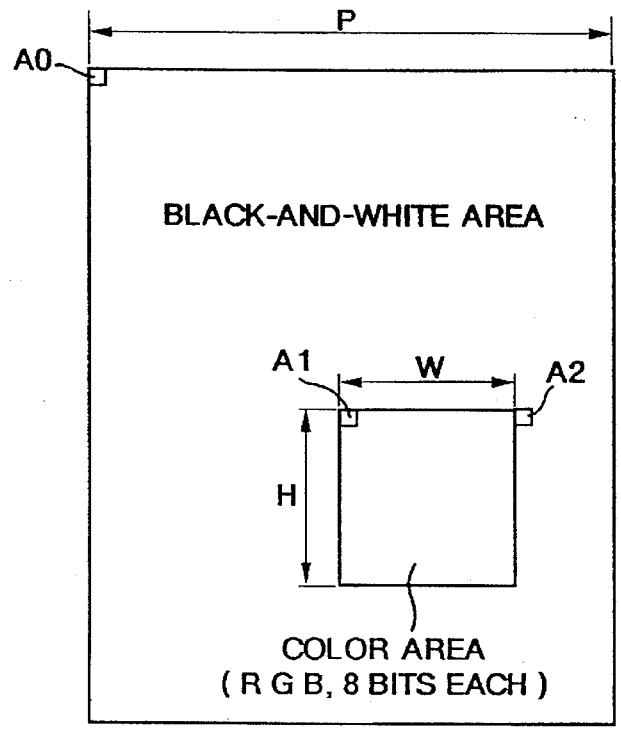
FIGS. 17A, 17B and 18 are views which serve to illustrate display examples in the second embodiment of the invention.
Figure 17B:
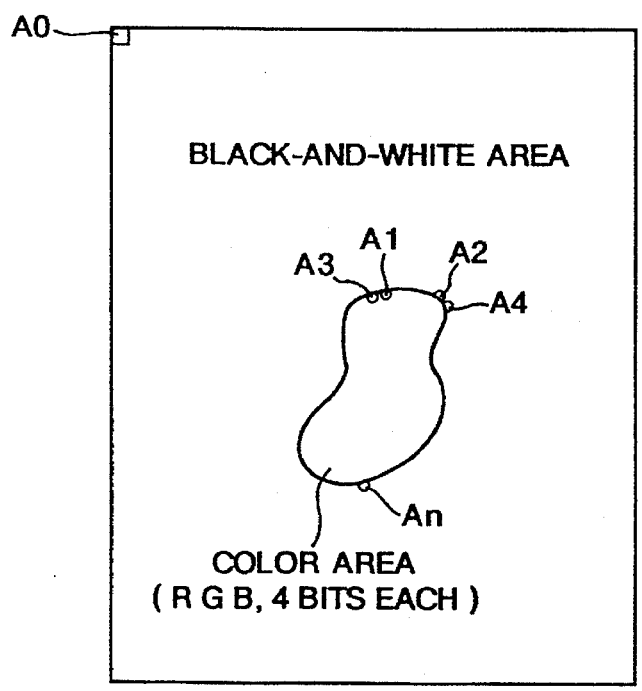
Figure 18:
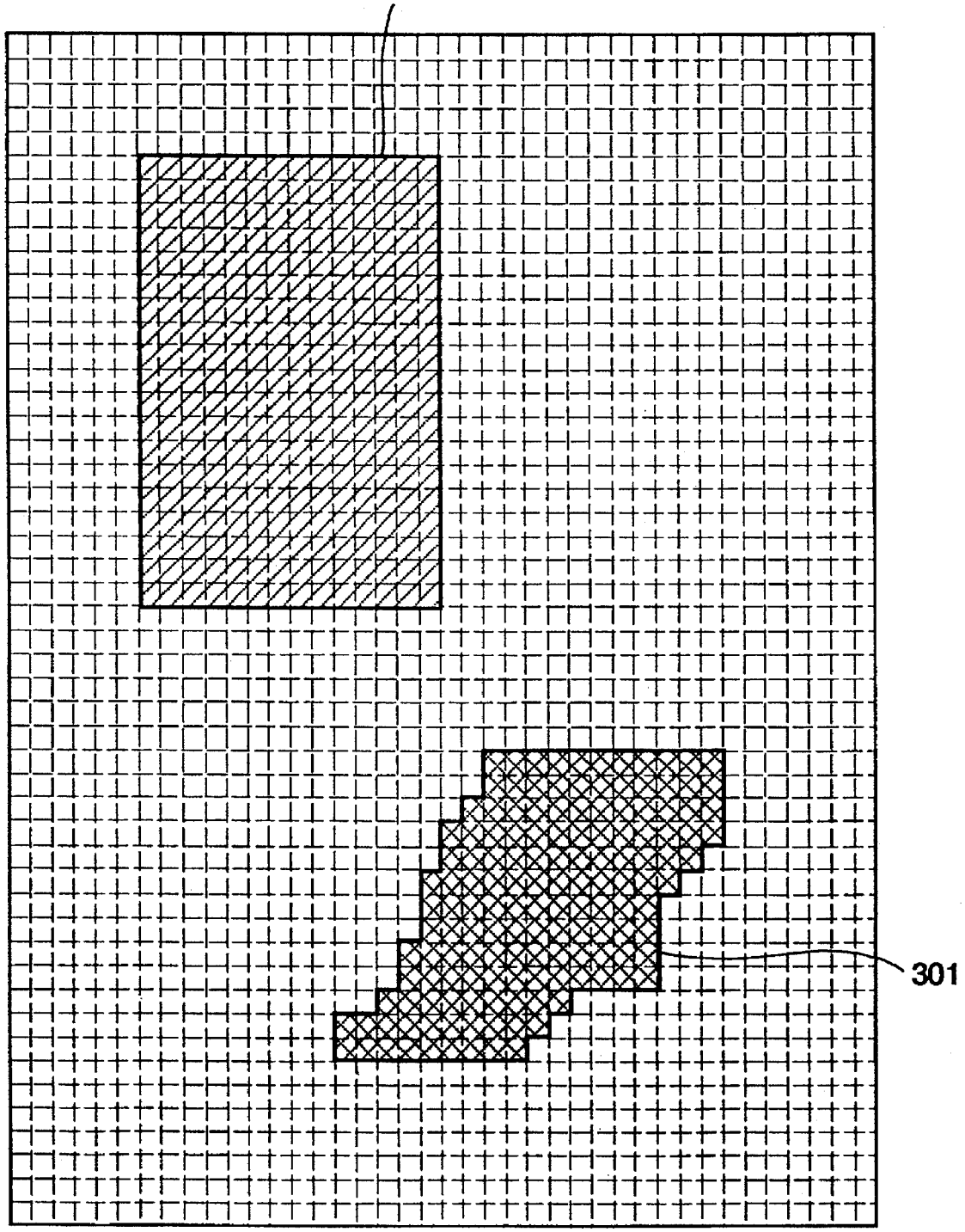
Figure 20A:
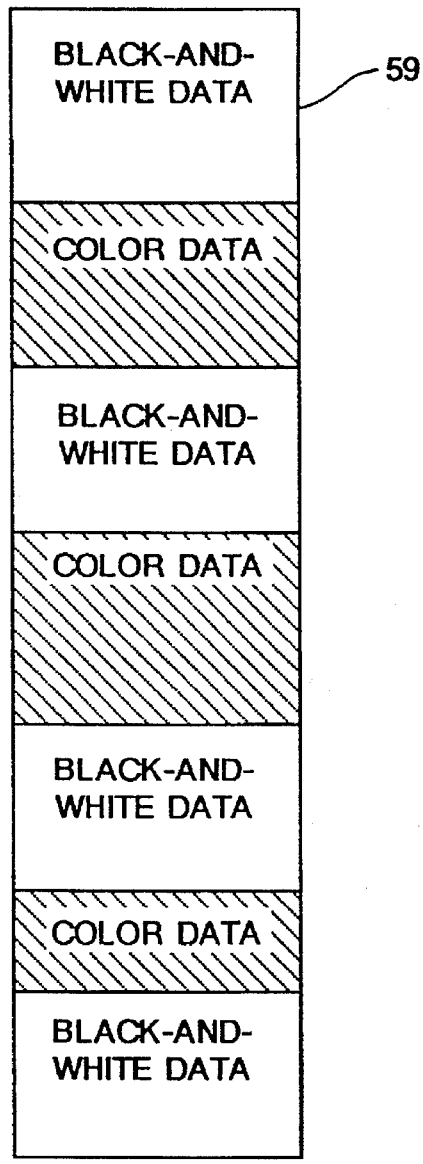
FIGS. 20A and 20B are views which serve to illustrate data allocation in the VRAM used in the second embodiment.
Figure 20B:
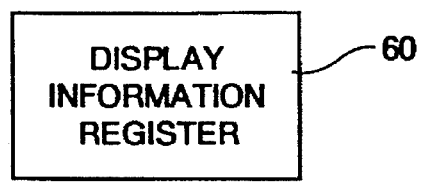

FIGS. 17A, 17B and 18 are views which serve to illustrate display examples provided by the second embodiment of the present invention. FIGS. 19A, 19B and 19C are views which serve to illustrate the way in which the display information register 60 is used. FIGS. 20A and 20B are views which serve to illustrate data allocation on the VRAM 59.

If the display frames shown in FIGS. 17A, 17B and 18 is to be formed, black-and-white data and color data are stored on the VRAM 59 in mixed form in accordance with the raster of the CRT 62 as shown in FIG. 20A. Information on pointers representing the display start addresses STADR for the black-and-white data and the color data, respectively, is stored in the display information register 60 shown in FIG. 20B. To provide a display on the CRT 12, image data is read from the VRAM 59 and fed to the color-information converter 61. The color-information converter 61 converts the black-and-white data and the color data of the image data so that both the image data match the interface of the CRT 62. Thereafter, the thus-converted image data is fed to the CRT 62. In FIG. 17A, P represents an interval corresponding to one pitch (5 bytes).

To provide the display frames shown in FIGS. 17A, 17B and 18, scripts such as those shown in FIGS. 19A, 19B and 19C are written to the display information register 60.

For example, if a single rectangular color image area is present in a black-and-white image as shown in FIG. 17A, a script of only three lines is required as shown in FIG. 19A. In this case, within a black-and-white image in which STADR is made A0, there exists a color image area in which a color image is formed over H lines in the sub-scan direction between A1 and A2 of the display start address STADR. As can be seen from FIG. 19A, the white-and-black image data is made available from bit "0", while the color data is made available from bit α. In FIG. 17A, W represents the width of the color image in the main-scan direction. FIG. 17B shows a display frame in which a color image area surrounded by a curve is present in a black-and-white image area. In this case, as shown in FIG. 19B, the portion between A0 and An of the display start address STADR corresponds to image data containing display information, while β1 to βn indicate available bit positions in the byte of the black-and-white data or the color data in the respective display start addresses STADR.

A specific display example is explained with reference to FIG. 18.

In the display frame shown in FIG. 18, reference numeral 300 denotes a rectangular color image consisting of pixels of 8 bits each, and reference numeral 301 denotes a color image consisting of pixels of 4 bits each and having a configuration different from a rectangle. All the display information required to form the above display image can be represented by a script of only seventeen lines as shown in FIG. 19C. In FIGS. 18 and 19C, the first line in the display information stored in the display information register 60 represents that black-and-white data starts from bit "0" in the display start address STADR. The second line represents that the portion up to the sixth pixel in the eight bits of display start address STADR "19hex" corresponds to black-and-white data, and that color data of R, G and B of 8 bits each continues from the seventh pixel over 19 (13hex) lines in the sub-scan direction. The third line represents that white-and-black image data starts from the fifth pixel in the display start address STADR "1Bhex", and this white-and-black image data is repeated over 19 lines as described above. Accordingly, color data starts from the seventh pixel in display start address STADR "1Ehex" which is a value obtained by adding "5", a pitch address (5 bytes/pitch) in this example, to "19hex". Similarly, black-and-white data again starts from the fifth pixel in display start address STADR "20hex" which is a value obtained by adding "5", the pitch address (PA), to "1Bhex". In order to form the rectangular color image 300, the above-described process is repeated nineteen times.

As shown by the display information of the fourth line, black-and-white data continues from the fifth pixel in display start address STADR "75hex", which corresponds to the last repetition step of the black-and-white data, to the sixth pixel in display start address STADR "98hex". Starting from the seventh pixel in display start address STADR "98hex", color data of R, G and B of four bits each are present. The display information is stored in the order: black-and-white data from the second bit in display start address STADR "9Ahex", color data from the seventh bit in display start address STADR "98hex+5(PA)=9Dhex", black-and-white data from the second bit in display start address STADR "9Ahex+5(PA)=9Fhex", color data from the sixth bit in display start address STADR "A2hex", black-and-white data from the second bit in display start address STADR "9Ahex+5(PA)+5(PA)=A4hex", color data from the fifth bit in display start address STADR "A7hex", black-and-white data from the second bit in display start address STADR "9Ahex+5(PA)+5(PA)+5(PA)=A9hex", color data from the fifth bit in display start address STADR "A7hex+5(PA)=AChex", and black-and-white data from the first bit in display start address STADR "AEhex" when the display information in the eighth line is reached. In a similar manner, the color image 301 is also formed. If the first address in memory on the VRAM 59 is represented by "#0hex", black-and-white data of 1 bit/pixel continues from "#0hex" to the sixth bit in "#19hex" and, from the seventh bit of "#19H", color data of 24 bits/pixel continues over 14 pixels, that is, 24×14=336 bits=42 bytes=2Ahex bytes. Accordingly, black-and-white data appears at the seventh bit in display start address STADR "19hex"+"2Ahex"="#43hex".

The above-described various types of image data are, as shown in FIGS. 20A and 20B, stored in the VRAM 59 and the display information register 60 in accordance with the allocation shown.

The following is an explanation of the color-information converter 61.

Figure 21:
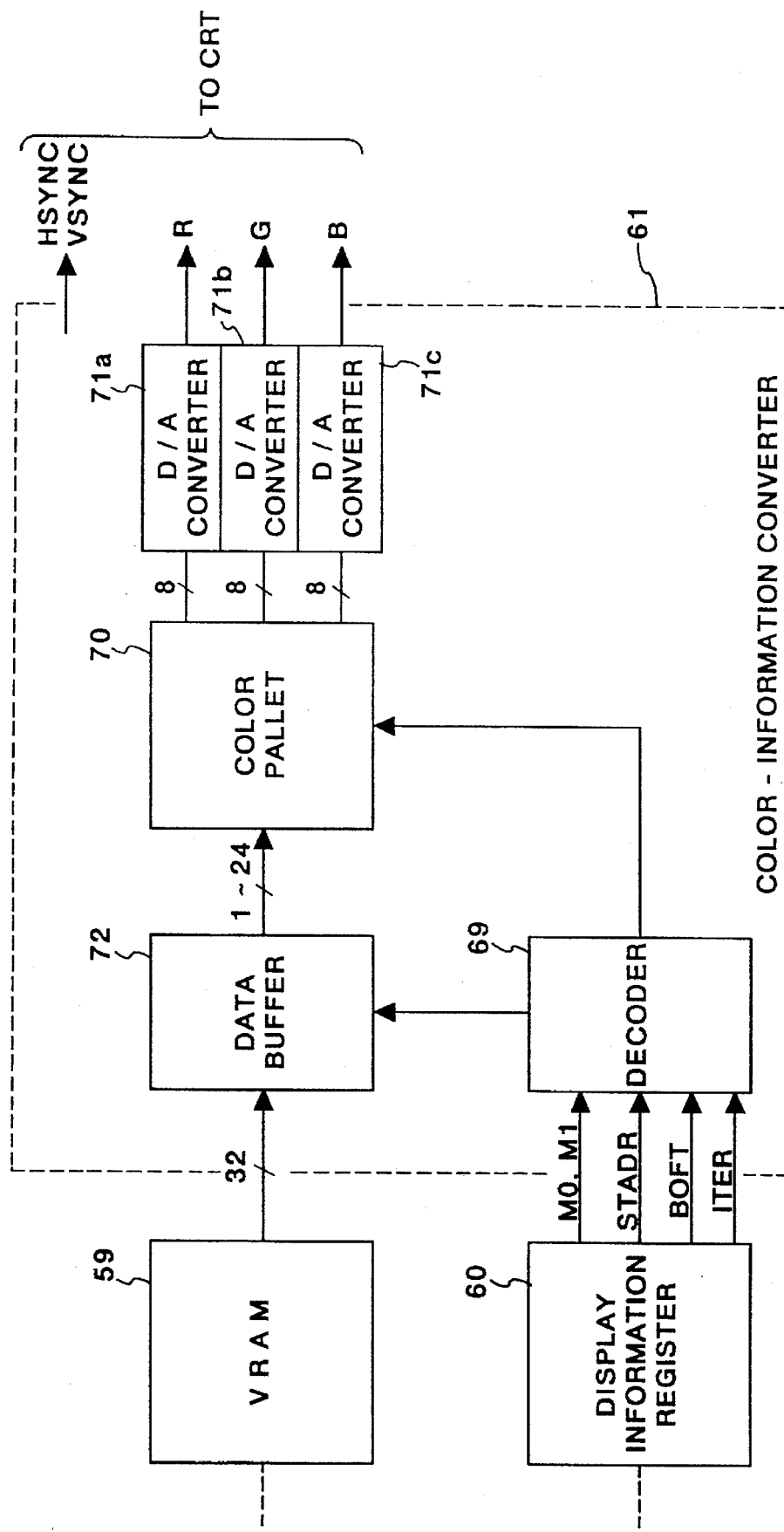
FIG. 21 is a block diagram showing the construction of the color-information converter used in the second embodiment of the invention.

FIG. 21 is a view showing the construction of the color-information converter 61 used in the second embodiment of the present invention. In the figure, a data buffer 72 temporarily stores the image data read from the VRAM 59, and a decoder 69 decodes the data output from the display information register 60. A color pallet 70 receives image data from the data buffer 72 in accordance with the result obtained by decoding in the decoder 69 (data type, display start address, and bit offset), and then outputs R, G and B signals of 8 bits each. If the data type of the image data decoded by the decoder 69 is (M1, M0)=(0, 0) which indicates black and white, image data for one bit is fed to the color pallet 70. If such data type is (M1, M0)=(0, 1) which indicates R, G and B of 2 bits each, image data for six bits is fed to the color pallet 70. If such data type is (M1, M0)=(1, 0) which indicates R, G and B of 4 bits each, image data for twelve bits is fed to the color pallet 70. If such data type is (M1, M0)=(1, 1) which indicates R, G and B of 8 bits each, image data for twenty-four bits is fed to the color pallet 70. Accordingly, the data buffer 72 and the color pallet 70 are physically connected by a bit data bus. The available image data width in this data bus dynamically varies between 1 bit and 24 bits in accordance with each data type. If the data classifying signal output from the decoder 69 is (M1, M0)=(0, 0) which indicates black and white, the color pallet 70 references the leftmost one bit in the image data supplied from the data buffer 72. The color pallet 70 generates 8-bit image data from each image data of R, G and B so that if the image data referenced is "1", black is displayed; if it is "0", white is displayed. If the aforesaid data classifying signal is (M1, M0)=(0, 1) which indicates R, G and B of 2 bits each, the color pallet 70 references the leftmost six bits (3×2 bits) in the image data supplied from the data buffer 72. At this time, the bits are beforehand set up in accordance with the image data supplied from the data buffer 72. The color pallet 70 then generates R, G and B image data of 8 bits each by adding the rightmost six bits of each of R, G and B. If the aforesaid data classifying signal is (M1, M0)=(1, 0) which indicates R, G and B of 4 bits each, the color pallet 70 references the leftmost twelve bits (3×4 bits) in the image data supplied from the data buffer 72. The color pallet 70 generates R, G and B image data of 8 bits each by adding the rightmost four bits of each of R, G and B. If the aforesaid data classifying signal is (M1, M0)=(1, 1) which indicates R, G and B of 8 bits each, the color pallet 70 converts the image data supplied from the data buffer 72 into the eight bits of each of R, G and B in accordance with a conversion table established beforehand.

D/A converters 71a, 71b and 71c convert to analog video signals the R, G and B video signals of 8 bits each output from the color pallet 70, respectively. The analog signals output from the respective D/A converters 71a to 71c are output to the CRT 62 together with synchronizing signals.

The following is an explanation of a method for displaying an image frame in which color data is inserted in black-and-white data.

Figure 22:
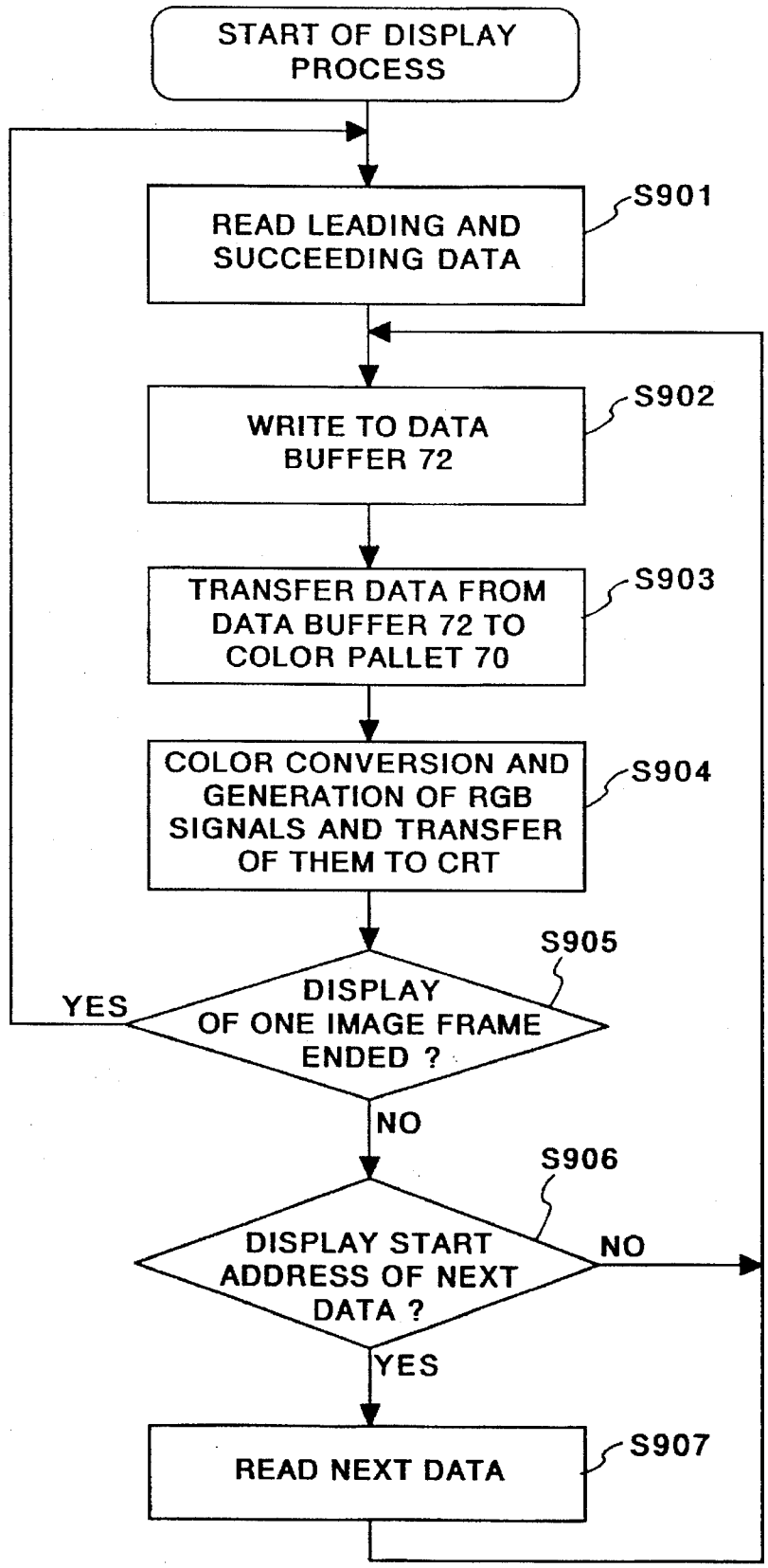
FIG. 22 is a flow chart which serves to illustrate the operation of the CPU used in the second embodiment of the invention.

FIG. 22 is a flow chart which serves to illustrate the operation of the CPU 51 used in the second embodiment of the invention.

In the following explanation, it may be assumed that insertion of a color image area in a document is specified, that black-and-white data and color data are stored in the VRAM 59, and that the display information shown in FIGS. 19A, 19B and 19C is stored in the display information register 60.

First of all, the leading data and the succeeding data are read from the display information register 60 (Step S901). Then, the image data which starts from the leading address in the VRAM 59 is read out and written to the data buffer 72 (Step S902). Then, the image data read in Step S901 is decoded by the decoder 69. The decoder 69 discriminates between black-and-white data and color data (discrimination of data type) and decodes the display start address of each image data and the length of a sequence of image data. The image data in the data buffer 72 is transferred to the color pallet 70 with a data width which conforms to the decoded data type (Step S903). The color pallet 70 converts the input image data into video signals of each of R, G and B, and the video signals of R, G and B are converted from digital form to analog form in the corresponding D/A converters 71a to 71c. The thus-converted analog R, G and B are output to the CRT 62 (Step S904).

In this manner, when a display for one image frame has been completed, the process returns to Step S901 and Steps S901 to S904 are repeated to form the next image frame (Step S905). If a display for one image frame has not yet been completed, the process proceeds to Step S906. In Step S902, as far as the current data type does not change until the display start address of the next image is not detected, the process returns to Step S902 and the aforesaid display process is repeated (Step S906). Subsequently, if the next data (display start address STADR) of a different data type is detected, the next data is read from the display information register 60 (Step S7). In this manner, the process returns to Step S902 and repeats the aforesaid process until the current data type changes.

As is apparent from the foregoing, in accordance with the second embodiment, since it is only necessary to access one byte with respect to black-and-white data of eight pixels, memory access time can be reduced and the memory size required to form one display frame can therefore be reduced. In consequence, the scale of the memory circuit can be made compact to achieve reductions in the complexity of the construction and the manufacturing cost of the apparatus.

While the invention has been described with reference to preferred embodiments, this description is solely for the purpose of illustration and is not to be construed as limiting the scope of the invention claimed below. On the contrary, various modifications may be made by those skilled in the art without departing from the true scope and spirit of the invention as defined by the appended claims.

What is claimed is:

1. An image processing apparatus comprising:
   storing means for storing a plurality of different types of image data for forming at least one frame of an image in a consecutive memory area, the plurality of different types of image data being able to represent a different number of colors and having a different data length;
   holding means for holding image output information corresponding to each of the plurality of different types of image data stored in said storing means;
   identifying means for identifying each of the plurality of different types of image data stored in said storing means and its data format in accordance with the image output information held in said holding means; and
   generating means for generating pixel data having a predetermined output image format from each of the plurality of different types of image data in response to the identified data format of the image data.

2. An image processing apparatus according to claim 1, wherein the plurality of different kinds of image data include black-and-white data and color data.

3. An image processing apparatus according to claim 1, wherein the image output information includes at least information representing the types of images.

4. An image processing apparatus according to claim 3, wherein the image output information further includes area information that represents an output start position a number of pixels from the output start position related to each of the plurality of different types of images.

5. An image processing apparatus according to claim 1, wherein said identifying means includes (i) decoding means for decoding the image output information held in said holding means, and (ii) converting means for converting the image data stored in said storing means into a predetermined amount of image data in accordance with the result of the decoding to output said predetermined amount of image data.

6. An image processing apparatus according to claim 5, wherein said converting means includes buffer means for buffering the image data stored in said storing means.

7. An image processing apparatus according to claim 6, wherein said converting means includes pointer generating means for nonlinearly generating a read pointer for the image data held in said buffer means in accordance with the result of decoding in said decoding means.

8. An image processing apparatus according to claim 1, further comprising image-forming means for forming a display image in which the plurality of different types of images are mixed in response to said pixel data generated by said generating means.

9. An image processing apparatus according to claim 1, further comprising image-forming means for forming a print image in which the plurality of different types of images are mixed in response to the pixel data generated by said generating means.

10. An image processing apparatus comprising:

storing means for storing a plurality of different types of image data for forming at least one frame of an image in a consecutive memory area, the plurality of different types of image data being able to represent a different number of colors and having a different data length;

holding means for holding image output information corresponding to each of the plurality of different types of image data stored in said storing means;

identifying means for identifying the different types of image data stored in said storing means and its data format in accordance with the image output information held in said holding means;

converting means for effecting color conversion of the different types of image data stored in said storing means in response to the identified data format and generating image data having the output image format; and image-forming means for forming an output image in accordance with the image data subjected to color conversion.

11. An image processing apparatus according to claim 10, wherein the plurality of different types of image data include black-and-white data and color data.

12. An image processing apparatus according to claim 10, wherein the image output information includes at least information representing the types of images.

13. An image processing apparatus according to claim 12, wherein the image output information further includes area information that represents an output start position and a number of pixels from the output start position related to each of the plurality of different types of images.

14. An image processing apparatus according to claim 10, wherein said converting means includes buffer means for buffering the image data stored in said storing means.

15. An image processing apparatus according to claim 14, wherein said converting means includes pointer generating means for nonlinearly generating a read pointer for the image data held in said buffer means in response to the result of decoding in said decoding means.

16. An image processing apparatus according to claim 10, wherein the output image comprises a display image.

17. An image processing apparatus according to claim 10, wherein the output image comprises a print image.

18. An image processing apparatus comprising:

storing means for storing a plurality of different types of image data for at least one frame of an image in a consecutive memory area, some of the plurality of different types of image data including color information and having a different data length for a same color;

discriminating means for discriminating a type of image data stored in said storing means; and converting means for converting the image data stored in said storing means into image data having a same data length for the same color in accordance with a discrimination result of said discriminating means.

19. An image processing apparatus according to claim 18, wherein said discriminating means includes reading out means for reading out the image data stored in said storing means sequentially.

20. An image processing apparatus according to claim 18, wherein the image data includes identifying information representing the types of images.

21. An image processing apparatus according to claim 18, further comprising outputting means for outputting image data converted by said converting means.

22. An image processing apparatus according to claim 21, wherein said outputting means comprises a color printer.

23. An image processing apparatus according to claim 21, wherein said outputting means comprises a color display.

24. An image processing method comprising the steps of:

storing a plurality of different types of image data for at least one frame of an image in a consecutive memory area of a memory, some of the plurality of different types of image data including color information and having a different data length for a same color;

discriminating a type of the image data stored in said memory; and converting the image data stored in said memory into image data having a same data length for the same color in accordance with a discrimination result of said discriminating step.

25. An image processing apparatus according to claim 24, wherein the image data includes identifying information representing the types of images.

26. An image processing apparatus according to claim 24, further comprising a step of outputting the image data converted into the same data length for one pixel.

* * * * *

UNITED STATES PATENT AND TRADEMARK OFFICE
CERTIFICATE OF CORRECTION

PATENT NO. : 5,659,673
DATED : August 19, 1997
INVENTOR(S) : HIROSHI NONOSHITA

Page 1 of 3

It is certified that error appears in the above-identified patent and that said Letters Patent is hereby corrected as shown below:

COLUMN 1

Line 15, "desk top" should read --desktop--.

COLUMN 2

Line 31, "it" should read --it is--.

COLUMN 4

Line 36, "frees," should read --frames,--.
Line 47, "frees," should read --frames,--.

COLUMN 6

Line 1, "undividual" should read --individual--.
Line 24, "FIG. 2B" should read --FIG. 2B,--.
Line 62, "image" (first occurrence) should be deleted.

COLUMN 7

Line 37, "the" should read --this--. (1st occurrence)

COLUMN 8

Line 14, "such" should be deleted.
Line 16, "Generator" should read --generator--.
Line 41, "four four" should read --four--.

UNITED STATES PATENT AND TRADEMARK OFFICE
CERTIFICATE OF CORRECTION

PATENT NO. : 5,659,673
DATED : August 19, 1997
INVENTOR(S) : HIROSHI NONOSHITA

It is certified that error appears in the above-identified patent and that said Letters Patent is hereby corrected as shown below:

<u>COLUMN 11</u>

Line 45, "tages." should read --tages:--.
 Line 51, "image" should read --images--.

<u>COLUMN 12</u>

Line 51, "table 2" should read --TABLE 2--.
 Line 64, "table 2" should read --TABLE 2--.

<u>COLUMN 13</u>

Line 9, "is" should read --are--.

<u>COLUMN 14</u>

Line 16, "the" should read --this--.

<u>COLUMN 15</u>

Line 12, "bits" should read --bits referred to--.

<u>COLUMN 16</u>

Line 49, "position" should read --position and--.

UNITED STATES PATENT AND TRADEMARK OFFICE
CERTIFICATE OF CORRECTION

PATENT NO. : 5,659,673

DATED : August 19, 1997

INVENTOR(S) : HIROSHI NONOSHITA

It is certified that error appears in the above-identified patent and that said Letters Patent is hereby corrected as shown below:

<u>COLUMN 18</u>

```
Line 44, "apparatus" should read --method--.
Line 47, "apparatus" should read --method--.
```

Signed and Sealed this

Seventeenth Day of March, 1998

Attest:

BRUCE LEHMAN

Attesting Officer

Commissioner of Patents and Trademarks